(12) United States Patent
Ohsawa et al.

(10) Patent No.: US 7,667,802 B2
(45) Date of Patent: Feb. 23, 2010

(54) TELEVISION SET USING LIQUID CRYSTAL DISPLAY APPARATUS HAVING IMPROVED VIEWING ANGLE

(75) Inventors: Kazuhiko Ohsawa, Hachioji (JP); Tetsushi Yoshida, Tsukui-gun (JP)

(73) Assignee: Casio Computer Co., Ltd., Tokyo (JP)

( * ) Notice: Subject to any disclaimer, the term of this patent is extended or adjusted under 35 U.S.C. 154(b) by 80 days.

(21) Appl. No.: 12/009,928

(22) Filed: Jan. 23, 2008

(65) Prior Publication Data

US 2008/0180604 A1    Jul. 31, 2008

(30) Foreign Application Priority Data

Jan. 26, 2007  (JP) ............... 2007-016655
May 10, 2007  (JP) ............... 2007-125782
Jan. 17, 2008  (JP) ............... 2008-008077

(51) Int. Cl.
   *G02F 1/1335*    (2006.01)
(52) U.S. Cl. .................................. 349/117
(58) Field of Classification Search ............. 349/117
   See application file for complete search history.

(56) References Cited

U.S. PATENT DOCUMENTS

| 6,307,608 B1 | 10/2001 | Sakamoto |
| 2005/0162593 A1 | 7/2005 | Miyachi |
| 2006/0238684 A1 | 10/2006 | Kiya et al. |

FOREIGN PATENT DOCUMENTS

| EP | 1069461 A2 | 1/2001 |
| JP | 3-132720 A | 6/1991 |
| JP | 2006-285220 A | 10/2006 |

OTHER PUBLICATIONS

Japanese Office Action dated Jan. 6, 2009, and English translation thereof issued in counterpart Japanese Application No. 2008-008077.
International Search Report and Written Opinion dated Jun. 2, 2008, issued in a counterpart International Application.

*Primary Examiner*—David Nelms
*Assistant Examiner*—Phu Vu
(74) *Attorney, Agent, or Firm*—Frishauf, Holtz, Goodman & Chick, P.C.

(57) ABSTRACT

A broadcasting receiving apparatus includes a liquid crystal display device including a liquid crystal cell in which a liquid crystal layer that is twist-aligned at 90° and sandwiched between a pair of substrates, first and second polarizing layers arranged to sandwich the cell therebetween so that their absorption axes are set in parallel with directions crossing aligning treatment directions of the substrates at 45°, and viewing angle compensating plates respectively arranged between the polarizing layers and the cell. A total value of retardations in a thickness direction, defined as a value of a product of a phase difference within a plane perpendicular to substrate surfaces of the cell and a layer thickness, of optical layers present between the polarizing layers is set to a value that substantially cancels out a retardation in a liquid crystal layer thickness direction when a saturation voltage is applied to the liquid crystal layer.

22 Claims, 26 Drawing Sheets

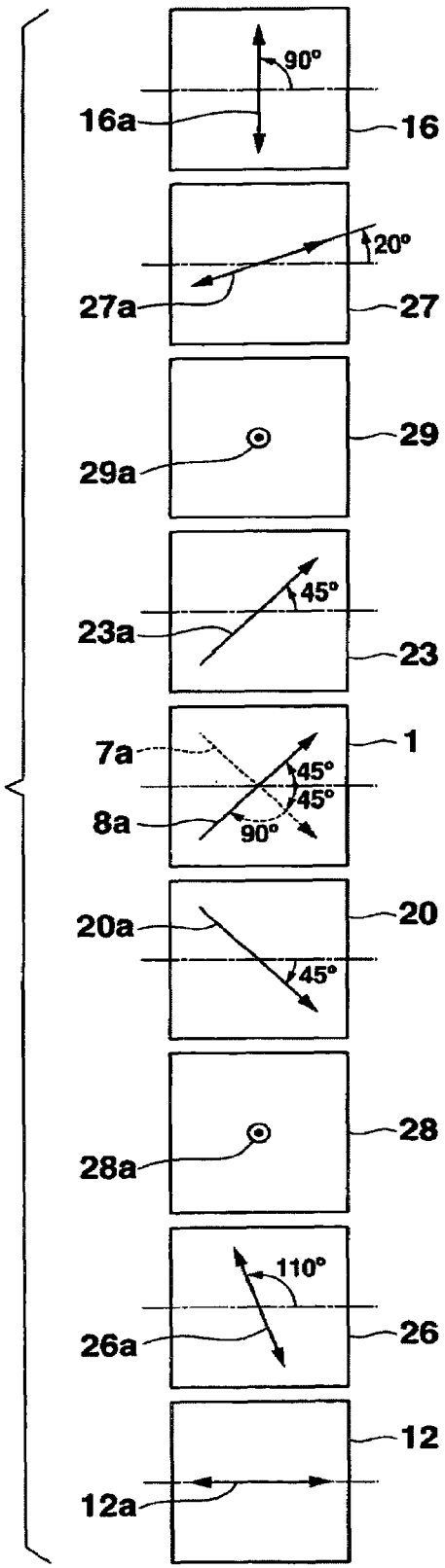

TELEVISION SET USING LIQUID CRYSTAL DISPLAY APPARATUS HAVING IMPROVED VIEWING ANGLE

CROSS-REFERENCE TO RELATED APPLICATIONS

This application is based upon and claims the benefit of priority from prior Japanese Patent Applications No. 2007-016655, filed Jan. 26, 2007; No. 2007-125782, filed May 10, 2007; and No. 2008-008077, filed Jan. 17, 2008, the entire contents of all of which are incorporated herein by reference.

BACKGROUND OF THE INVENTION

1. Field of the Invention

The present invention relates to a television receiver to receive broadcast waves to display pictures.

2. Description of the Related Art

A flat-screen liquid crystal television receiver using a liquid crystal display device to reduce its depth is known as a broadcasting receiver that receives a television broadcast to display its pictures.

Liquid crystal display devices used in this liquid crystal television receiver include a twisted nematic type liquid crystal display device (a TN liquid crystal display device) in which liquid crystal molecules are twist-aligned between substrates facing each other, a vertical alignment type liquid crystal display device (VA) having a liquid crystal layer in which liquid crystal molecules are vertically initially aligned between substrates, an in-plane switching type liquid crystal device (IPS) in which directions of liquid crystal molecules are controlled within a plane parallel to substrate surfaces, and others.

Of these liquid crystal devices, as a TN type liquid crystal display device, there is known a liquid crystal display device that includes a liquid crystal cell including a liquid crystal layer in which liquid crystal molecules are twist-aligned at a twisted angle of substantially 90° between a pair of substrates, and a pair of polarizing plates arranged to sandwich this liquid crystal cell therebetween, wherein one of the pair of polarizing plates is arranged in such a direction that an absorption axis is set to parallel with a direction crossing an aligning treatment direction of one substrate of the liquid crystal cell at 45° (see JP-A 2006-285220 (KOKAI)).

This TN liquid crystal display device enhances contrast and improves grayscale inversion in an intermediate gradation. Further, in this liquid crystal display device, viewing angle compensating plates are respectively arranged between the liquid crystal cell and the pair of polarizing plates, and arranging a retardation plate improves viewing angle characteristics. Further, since these TN liquid crystal display devices have simple structures and matured manufacturing processes, they are good display devices allowed to be mass-produced with stable characteristics.

However, the TN type liquid crystal display device has large viewing angle dependency of a transmittance as a television receiver observed from various directions, and hence sufficiently wide viewing angle characteristics cannot be obtained.

BRIEF SUMMARY OF THE INVENTION

An object of the present invention is to provide a liquid crystal display apparatus and a broadcasting receiving apparatus having a wide viewing angle with improved viewing angle dependency of a transmittance.

A liquid crystal display apparatus according to a first aspect of the present invention includes a liquid crystal display device.

The liquid crystal display device includes:

a liquid crystal cell including a pair of substrates in which at least one electrode and an alignment film covering the electrode are provided on each of inner surfaces of the substrates facing each other, and a liquid crystal layer that is sandwiched between the substrates and includes liquid crystal molecules twist-aligned;

first and second polarizing plates that are arranged on both sides of the liquid crystal cell, each of the polarizing plates including a polarizing layer having a transmission axis allowing transmission of linear polarized light and an absorption axis in a direction perpendicular to the transmission axis, and at least one base film to support the polarizing layer; and first and second viewing angle compensating layers that are respectively arranged between the liquid crystal cell and the first and second polarizing plates, each of the viewing angle compensating layers having a phase difference within a plane parallel to substrate surfaces of the liquid crystal cell and a phase difference within a plane perpendicular to the substrate surfaces.

A total value of retardations in a thickness direction, each of which is a product of a phase difference within a plane perpendicular to the substrate surfaces and a layer thickness, of a plurality of optical layers between the first and second polarizing layers, including at least the first and second viewing angle compensating layers but excluding the liquid crystal layer, is set to a value that cancels out a retardation in a liquid crystal layer thickness direction, which is a product of a phase difference within a plane perpendicular to the substrate surfaces and a liquid crystal layer thickness, of the liquid crystal layer when a voltage sufficiently high to raise and align the liquid crystal molecules with respect to the substrate surfaces is applied to the liquid crystal layer between the electrodes of the first and second substrates.

The liquid crystal display apparatus further includes a display driving section to supply signals to electrodes formed on a pair of substrates and to drive the liquid crystal display device based on picture data supplied from the outside.

Furthermore, a broadcasting receiving apparatus according to a second aspect of the present invention includes:

a broadcasting receiving section to receive broadcasted broadcast waves and to demodulate the received waves to output a demodulation signal having at least picture data and audio data;

an picture/audio data generating section to separate the picture data and the audio data from the demodulation signal output from the broadcasting receiving section and to output a picture data and an audio data based on the demodulation signal;

a picture display section to drive a plurality of pixels aligned in a matrix based on the picture data supplied from the picture/audio data generating section to display pictures; and a liquid crystal display device.

The liquid crystal display device includes:

a first substrate having, on one surface thereof, at least one first electrode and an alignment film covering the first electrode;

a second substrate that is arranged to face an electrode formation surface of the first substrate, and has, on a surface thereof facing the first substrate, a plurality of second electrodes in which regions respectively facing the first electrode form a plurality of pixels aligned in a matrix to form images and an alignment film covering these electrodes;

a liquid crystal layer that is sandwiched between the first and second substrates and includes liquid crystal molecules twist-aligned at substantially 90°;

first and second polarizing plates that are arranged on both sides of the liquid crystal cell, each of the polarizing plates including a polarizing layer having a transmission axis allowing transmission of linear polarized light and an absorption axis in a direction perpendicular to the transmission axis, and at least one base film to support the polarizing layer; and first and second viewing angle compensating plates that are respectively arranged between the liquid crystal cell and the first and second polarizing plates, each of the viewing angle compensating plates having a phase difference within a plane parallel to substrate surfaces of the liquid crystal cell and a phase difference within a plane perpendicular to the substrate surfaces, and a total value of retardations in a thickness direction, each of which is a product of a phase difference within a plane perpendicular to the substrate surfaces and a layer thickness, of a plurality of optical layers between the first and second polarizing layers, including at least the first and second viewing angle compensating plates but excluding the liquid crystal layer, is set to a value that cancels out a retardation in a liquid crystal layer thickness direction, which is a product of a phase difference within a plane perpendicular to the substrate surfaces and a liquid crystal layer thickness, of the liquid crystal layer when a voltage sufficiently high to raise and align the liquid crystal molecules with respect to the substrate surfaces is applied between the electrodes of the first and second substrates.

The broadcasting receiving apparatus further includes an audio generating section to generate the audio signal based on the audio data supplied from the picture/audio data generating section and to produce audio from the audio signal.

Moreover, a broadcasting receiving apparatus according to a third aspect of the present invention includes:

a broadcasting receiving section to receive broadcasted broadcast waves and to demodulate the received waves to output a demodulation signal having at least picture data and audio data;

an picture/audio data generating section to separate the picture data and the audio data from the demodulation signal output from the broadcasting receiving section and to output a picture data and an audio data based on the demodulation signal;

a picture display section to drive a plurality of pixels aligned in a matrix based on the picture data supplied from the picture/audio data generating section to display pictures; and a liquid crystal display.

The liquid crystal display device includes:

a first substrate having, on one surface thereof, at least one electrode and a first alignment film covering the first electrode and subjected to an aligning treatment in a predetermined first direction;

a second substrate that is arranged to face an electrode formation surface of the first electrode, and has, on a surface thereof facing the first substrate, a plurality of second electrodes in which regions respectively facing the first electrode form a plurality of pixels aligned in a matrix to form images and a second alignment film covering the second electrode and subjected to an aligning treatment in a second direction crossing the first direction at an angle of substantially 90°;

a liquid crystal layer that is sandwiched between the first alignment film of the first substrate and the second alignment film of the second substrate and includes liquid crystal molecules twist-aligned between the first alignment film and the second alignment film at a twisted angle of substantially 90°;

a first polarizing layer that is arranged to face an outer surface opposite to the electrode formation surface of the first substrate and has an absorption axis in a direction crossing an aligning treatment direction of the first alignment film at an angle of substantially 45°;

a second polarizing layer that is arranged to face an outer surface opposite to an electrode formation surface of the second substrate and has an absorption axis in a direction substantially perpendicular to or substantially parallel to the absorption axis of the first polarizing layer; and first and second viewing angle compensating layers that are respectively arranged between the first substrate and the first polarizing layer and between the second substrate and the second polarizing layer, each viewing angle compensating layer having a phase difference within a plane parallel to substrate surfaces of the first and second substrates and a phase difference within a plane perpendicular to the substrate surfaces.

In regard to a plurality of optical layers between the first and second polarizing layers including at least the first and second viewing angle compensating layers but excluding the liquid crystal layer, a retardation Rth in a thickness direction is set to the range satisfying the following expression:

$$-80 \text{ nm} < Rth - 0.83 \Delta nd < 80 \text{ nm}$$

where one and the other of two directions perpendicular to each other within a plane parallel to the substrate surfaces are an X axis and a Y axis, a thickness direction perpendicular to the substrate surfaces is a Z axis, nx is a refractive index in the X axis direction, ny is a refractive index in the Y axis direction, nz is a refractive index in the Z axis direction, d is a layer thickness of the optical layer, Rthi is a retardation in the thickness direction of each optical layer represented as $\{(nx+ny)/2-nz\}\cdot d$, Rth is the retardation in the thickness direction obtained by adding values of the retardations Rthi in the thickness direction of the respective optical layers, and $\Delta nd$ is a product of an anisotropic refractive index $\Delta n$ of a liquid crystal material constituting the liquid crystal layer and a liquid crystal thickness d; and The broadcasting receiving apparatus further includes an audio generating section to generate the audio signal based on the audio data supplied from the picture/audio data generating section and to produce audio from the audio signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 19 is a view showing aligning treatment directions of first and second alignment films, directions of absorption axes of first and second polarizing layers, directions of optical axes of first and second viewing angle compensating layers, directions of retardation axes of first and second retardation plates, directions of optical axes of first and second optical films;

DETAILED DESCRIPTION OF THE INVENTION

First Embodiment

Figure 1:
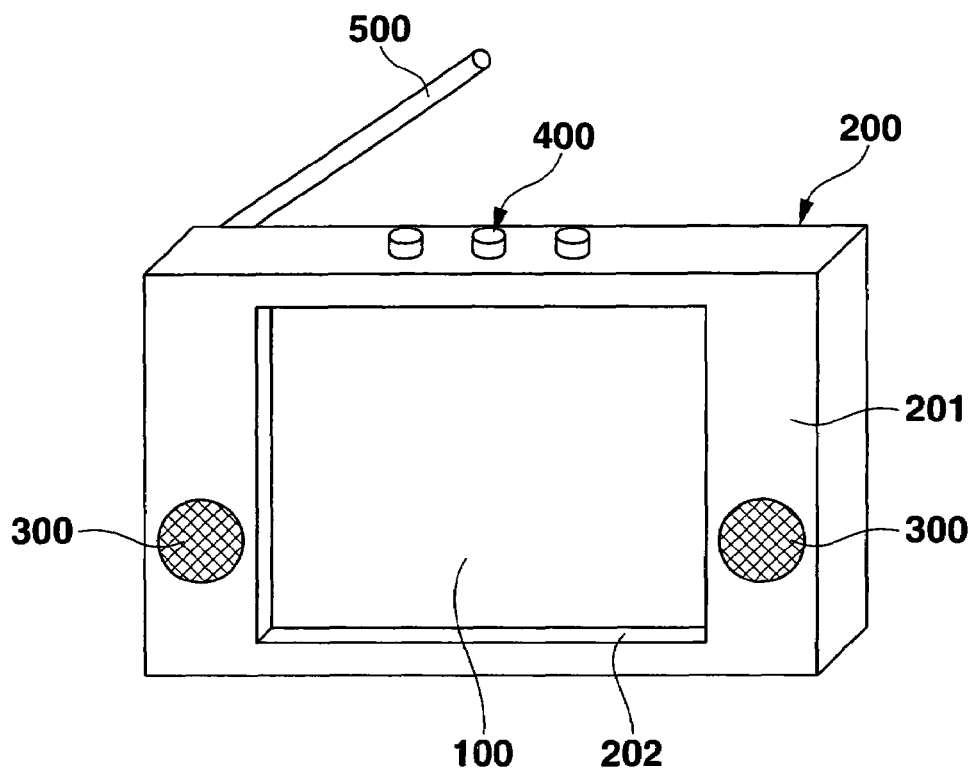
FIG. 1 is a schematic perspective view of a broadcasting receiving apparatus showing a first embodiment according to the present invention.
Figure 2:
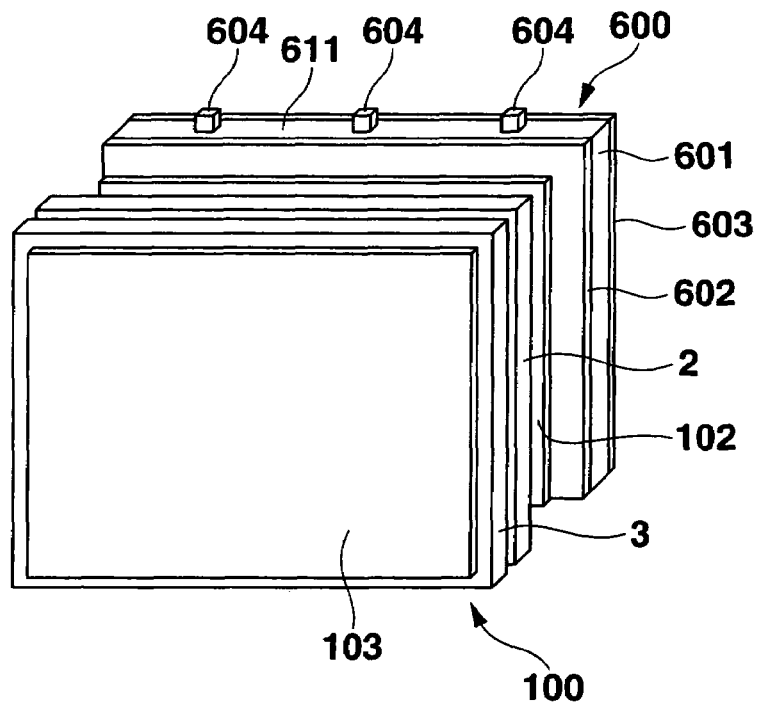
FIG. 2 is a schematic perspective view showing a structure of a liquid crystal display apparatus used in the broadcasting receiving apparatus according to the first embodiment.

FIGS. 1 to 4 show a structure of a television broadcasting receiver in a first embodiment according to the present invention. As shown in FIG. 1, a broadcasting receiver 200 includes a window 202 formed on a front surface of a housing 201 in accordance with a liquid crystal display device, and speakers 300 to produce audio, which are arranged on both sides of the window 202. A switch group 400, including, e.g., a power supply switch, a channel changeover switch, and a volume adjustment switch, is arranged on an upper portion of the housing 201. An antenna 500 to receive broadcast waves is arranged on a rear surface of the housing 201.

A liquid crystal display device 100, which is arranged in accordance with the window 202 of the housing 201, includes a pair of substrates 2 and 3 facing each other and optical plates 102 and 103 that are arranged on both sides of the pair of substrates, each of the optical plates being obtained by stacking a later-explained polarizing plate, a viewing angle compensating plate, and an optical layer formed of various kinds of retardation plates.

A backlight 600 is arranged on an opposite side of an observation side of this liquid crystal display device 100. This backlight 600 includes a light guiding plate 601, an optical film 602, which may include a diffusion film and a prism sheet, arranged on surface of the light guiding plate 601 on the liquid crystal display device 100 side, a reflection film 603 arranged on the opposite side of the observation side of the light guiding plate 601, and a plurality of light sources 604, which may be LEDs, aligned on an end face 611 of the light guiding plate 601. This backlight 600 introduces light emitted from the plurality of light sources 604 to the light guiding plate 601 from the end face 611, causing the light to propagate within the light guiding plate 601. The light that has exited from the opposite side of the observation side of the light guiding plate 601 is reflected by the reflection film 603 to again enter the light guiding plate 601, and the light that has exited from an exit surface of the light guiding plate 601 facing the liquid crystal display device 100. The light that has exited from the exit surface of the light guiding plate 601 is diffused by the diffusion film of the optical film 602 to become light having uniform brightness, and is directed toward the liquid crystal display device 100 by the prism sheet. Thus, the liquid crystal display device 100 performs transmission type display by using the light exiting the backlight 600.

Figure 3:
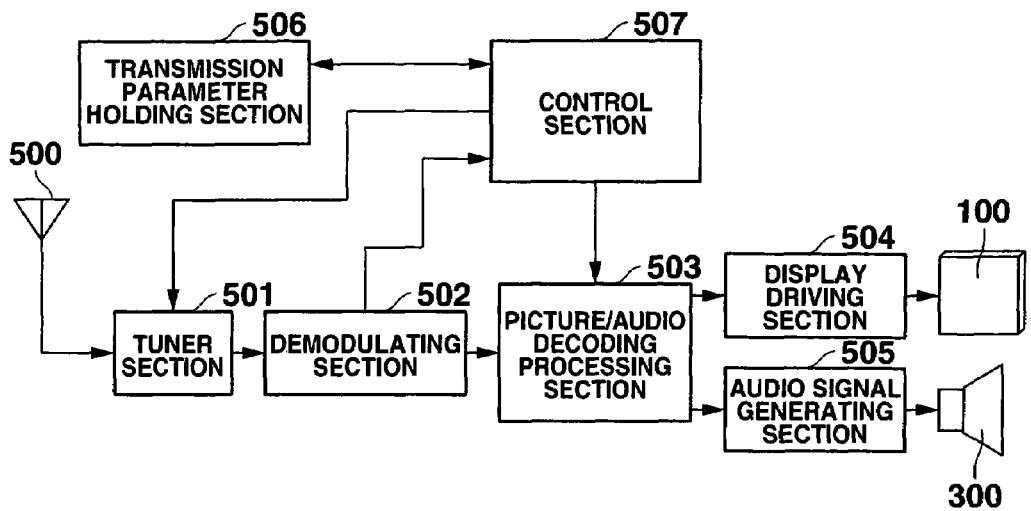
FIG. 3 is a schematic block diagram showing a structure of, the broadcasting receiving apparatus showing the first embodiment.

FIG. 3 shows a structure of a television receiver that receives digital broadcasting in this first embodiment. In this FIG. 3, a television receiver 200 includes an antenna 500 to receive broadcast waves including a broadcasting signal containing picture data and audio data and a transmission control signal for, e.g., a transmission parameter transmitted from a broadcasting station, a tuner section 501 to which the broadcast waves received by this antenna 500 are supplied, a demodulating section 502 to demodulate the broadcasting signal taken out by this tuner section 501, a picture/audio decoding processing section 503 to decode the demodulated broadcasting signal, a display driving section 504 to drive the liquid crystal display device 100 based on the decoded picture data, an audio signal generating section 505 to generate an audio signal based on the audio data and to drive the speakers 300, a transmission parameter holding section 506 to store a parameter, and a control section 507 to control operations of these respective sections.

The transmission parameter holding section 506 sets a parameter as information required to take out a frequency of a specified channel in the tuner section 501. The picture/audio decoding processing section 503 separates picture data and audio data from the demodulated broadcasting signal, and decodes the compressed and/or shuffled data to output the picture data and the audio data.

In the television receiver 200, the tuner section 501 takes out a frequency of a specified channel from a digital broadcasting signal received by the antenna 500 based on a parameter set by reading the parameter of the specified channel from the transmission parameter holding section 506 by the control section 507.

The demodulating section 502 takes out a clock signal included in the digital broadcasting signal having the frequency taken out by the tuner section 501 to demodulate the digital broadcasting signal, and outputs a transport stream.

The picture/audio decoding processing section 503 decodes the transport stream to output the picture data and the audio data.

The picture data output from a picture/audio data generating section including the picture/audio decoding processing section 503 is supplied to a picture display section including the display driving section 504 and the liquid crystal display device 100, a driving signal associated with the picture data is generated by the display driving section 504, and this driving signal is supplied to the liquid crystal display device 100, thereby displaying a picture.

Further, the audio data output from the picture/audio decoding processing section 503 is supplied to an audio generating section including the audio signal generating section 505 and the speakers 300, an audio signal is generated by the audio signal generating section 505, and the speakers are driven based on this audio signal, thereby reproducing audio.

Figure 4:
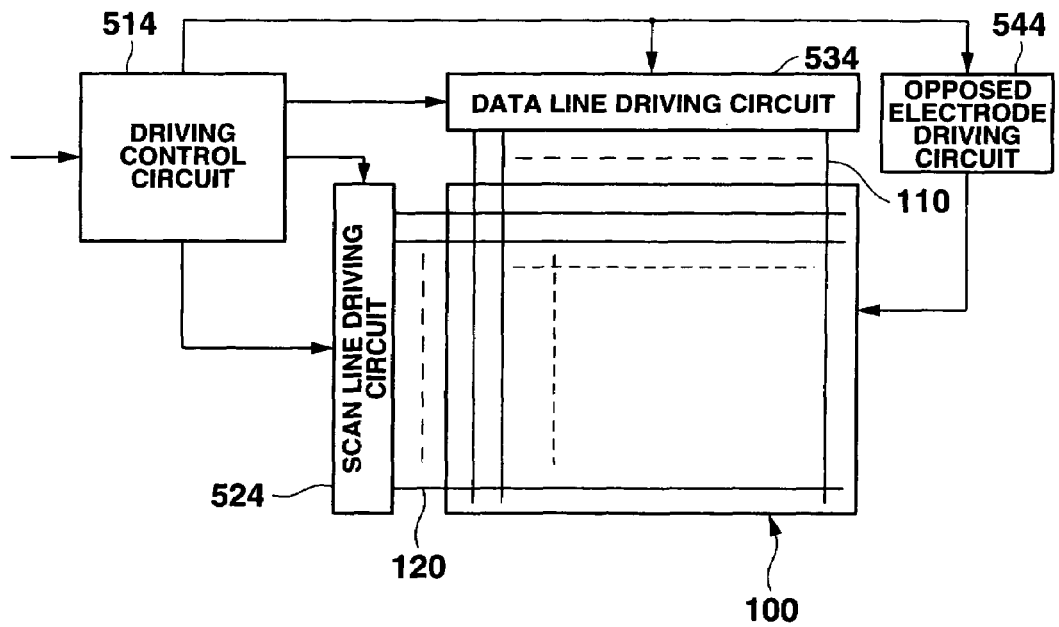
FIG. 4 is a block diagram showing a liquid crystal display apparatus used in the broadcasting receiving apparatus according to the first embodiment.

As shown in FIG. 4, the picture display section includes the liquid crystal display device 100, a data line driving circuit 534, a scan line driving circuit 524, a opposed electrode driving circuit 544, and a driving control circuit 514 to control operations of these circuits.

The liquid crystal display device 100 in this embodiment is, e.g., an active matrix type liquid crystal display device, and includes a liquid crystal cell including a pair of substrates in which at least one electrode and an alignment film covering the electrode are provided on each of inner surfaces of the substrates, and a liquid crystal layer that is sandwiched between the substrates and includes liquid crystal molecules twist-aligned at substantially 90°. One of the pair of substrates is provided with, on its substrate surface, at least one opposed electrode, and the other substrate is provided with, on its substrate surface facing the opposed electrode, a plurality of pixel electrodes in which regions respectively facing the opposed electrode form a plurality of pixels aligned in a matrix to form images. Furthermore, although not shown, a plurality of thin film transistors formed of TFTs associated with the pixel electrodes are arranged on the other substrate, and a plurality of data lines 110 connecting drain electrodes of the thin film transistors in accordance with each column and a plurality of gate lines 120 connecting gate electrodes of the thin film transistors in accordance with each row are arranged.

The data lines 110 of the liquid crystal display device 100 are respectively connected with the data driving circuit 534, the gate lines 120 are respectively connected with the scan line driving circuit 524, and the opposed electrode is connected with the opposed electrode driving circuit 544. The driving control circuit 514 generates an image signal based on picture data supplied from the picture/audio decoding processing section 503, and supplies it together with a control signal, e.g., a clock signal to the data line driving circuit 534. The data line driving circuit 534 generates a driving signal associated with each data line 110 based on the supplied image signal, and applies it to each data line 110. The scan line driving circuit 524 generates a scan signal associated with each scan line 120 based on the control signal supplied from the driving control circuit 514, and supplies it to each gate line 120.

As explained above, in the liquid crystal display device 100, the plurality of gate lines 120 are sequentially scanned by the scan line driving circuit 524, the driving signal corresponding to the picture data is supplied to each data line 110 from the data line driving circuit 534 in synchronization with this scanning, and a voltage associated with the driving signal is applied to each pixel, thereby displaying a desired picture.

Figure 5:
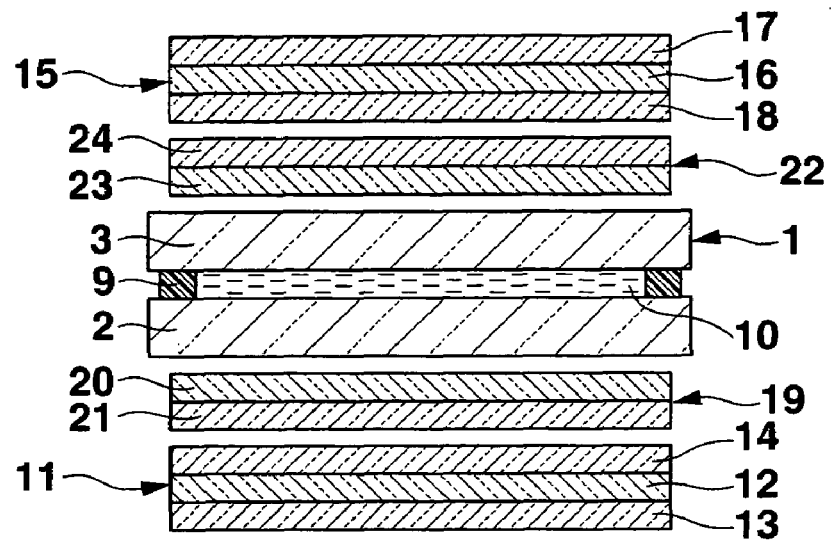
FIG. 5 is a schematic cross-sectional view of a liquid crystal display device showing a first embodiment of the present invention.

FIGS. 5 to 12 show a detailed structure of a liquid crystal display device used in a first embodiment according to the present invention, and FIG. 5 is a schematic cross-sectional view of the liquid crystal display device.

This liquid crystal display device is a TN type liquid crystal display device including a liquid crystal cell 1 including a nematic liquid crystal layer 10 in which liquid crystal molecules are twist-aligned at a twisted angle of substantially 90° sandwiched between a pair of transparent substrates 2 and 3, a pair of first and second polarizing plates 11 and 15 arranged to sandwich this liquid crystal cell 1, and first and second viewing angle compensating plates 19 and 22 respectively arranged between the liquid crystal cell 1 and the pair of polarizing plates 11 and 15.

Figure 6:
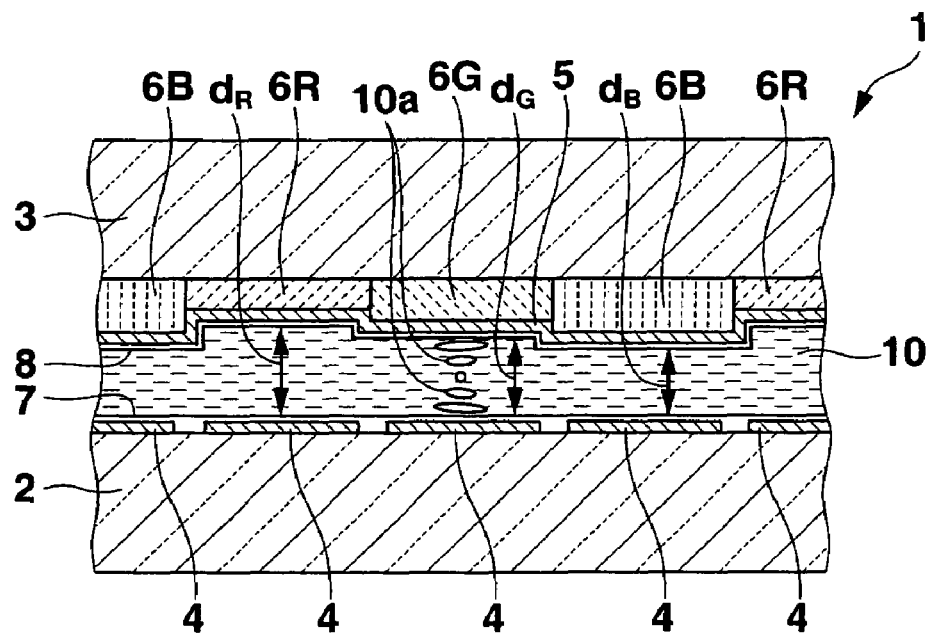
FIG. 6 is an enlarged cross-sectional view of a part of a liquid crystal cell.

FIG. 6 is an enlarged cross-sectional view of a part of the liquid crystal cell 1. This liquid crystal cell 1 includes a first substrate 2, a second substrate 3 arranged to face this first substrate, and a liquid crystal layer 10 arranged between the first and second substrates. The first substrate 2 has at least one first transparent electrode 4 and a first alignment film 7 that covers the first electrode 4 and is subjected to aligning treatment in a predetermined first direction, the first transparent electrode 4 and the first alignment film 7 being provided on one surface thereof. The second substrate 3 is arranged to face an electrode formation surface of the first substrate 2, and has at least one second transparent electrode 5 facing the first electrode 4, and a second alignment film 8 that covers the second transparent electrode 5 and is subjected to an aligning treatment in a second direction crossing the first direction for covering the second electrode 5 at an angle of substantially 90°, the second transparent electrode 5 and the second alignment film 8 being provided on a surface facing the first substrate 2. The liquid crystal layer 10 is sandwiched between the first alignment film 7 and the second alignment film 8, and liquid crystal molecules 10a are twist-aligned at a twisted angle of substantially 90° between the first alignment film 7 and the second alignment film 8. This liquid crystal layer 10 optically rotates a polarized light that has entered in an initial alignment state of liquid crystal molecules 10a at 90°. Moreover, this liquid crystal layer 10 apparently changes a value of a retardation produced with respect to transmitted light within the range of substantially λ/2 in accordance with an alignment state of the liquid crystal molecules 10a.

This liquid crystal cell 1 is an active matrix liquid crystal cell, and the electrode 4 provided on the substrate (which will be referred to as a rear substrate hereinafter) 2, located on an opposite side of a display observation side, is formed of a plurality of pixel electrodes aligned in a matrix, in a row direction (a lateral direction of a screen) and a column direction (the lateral direction of the screen). The electrode 5 provided on the other substrate (which will be referred to as a front substrate hereinafter) 3, located on the observation side, is a single-film-like opposed electrode formed to face an entire arrangement region of the plurality of pixel electrodes 4.

Although omitted in FIG. 6, a plurality of TFTs (thin film transistors) respectively arranged in accordance with the plurality of pixel electrodes 4, a plurality of scanning lines through which gate signals are supplied to the plurality of TFTs in respective rows, and a plurality of signal lines through which data signals are supplied to the plurality of TFTs in respective columns are provided on a surface of the rear substrate 2 facing the front substrate 3.

The TFT includes a gate electrode formed on the rear substrate 2, a gate insulating film formed to cover the gate electrode, an i-type semiconductor film formed on the gate insulating film to face the gate electrode, and a drain electrode and a source electrode formed on both side portions of the i-type semiconductor film through an n-type semiconductor film. The gate electrode is connected with the scanning line, the drain electrode is connected with the signal line, and the source electrode is connected with the corresponding pixel electrode 4.

Additionally, color filters 6R, 6G, and 6B of three colors, i.e., red, green, and blue are provided on a surface of the front substrate 3 facing the rear substrate 2 in accordance with a plurality of pixels formed of regions where the plurality of pixel electrodes 4 face the opposed electrode 5, and the opposed electrode 5 is provided to cover the color filters 6R, 6G, and 6B.

Further, the pair of substrates 2 and 3 are arranged to face each other with a predetermined gap provided therebetween, and bonded to each other through a sealing member 9 (see FIG. 5) formed into a frame shape surrounding an arrangement region of the plurality of pixel electrodes 4. The liquid crystal layer 10 is encapsulated in a region between the pair of substrates 2 and 3 surrounded by the sealing member 9.

Furthermore, as to the color filters 6R, 6G, and 6B of three colors, i.e., red, green, and blue, the green filter 6G is formed to be thicker than the red filter 6R and the blue filter 6B is formed with a larger film thickness than that of the green filter 6G, so that a liquid crystal layer thickness $d_R$ of one of the pixels to which the red filter 6R is provided, a liquid crystal layer thickness $d_G$ of one of the pixels to which the green filter 6G is provided, and a liquid crystal layer thickness $d_B$ of one of the pixels to which the blue filter 6B is provided have a relationship of $d_R > d_G > d_B$.

A ratio of the liquid crystal layer thickness $d_R$ of the pixel to which the red filter 6R is provided, the liquid crystal layer thickness $d_G$ of the pixel to which the green filter 6G is provided, and the liquid crystal layer thickness $d_B$ of the pixel to which the blue filter 6B is provided is set to $d_R:d_G:d_B=$ 1.1:1.0:0.9.

Moreover, of the pair of polarizing plates arranged to sandwich the liquid crystal cell 1 therebetween, the first polarizing plate 11 arranged to face an outer surface of the liquid crystal cell 1 opposite to the electrode formation surface of the rear substrate 2 is arranged so that its absorption axes is set to parallel with a direction crossing an aligning treatment direction of the first alignment film 7 formed on the rear substrate 2 at an angle of substantially 45°. The second polarizing plate 15 arranged to face an outer surface of the liquid crystal cell 1 opposite to the electrode formation surface of the substrate 3 is arranged so that its absorption axes is set to parallel with a direction crossing the aligning treatment direction of the second alignment film 8 formed on the front substrate 3 at an angle of substantially 45°. That is, the absorption axes of the first polarizing plate 11 and the second polarizing plate 15 are perpendicular to each other.

The first polarizing plate 11 includes a first polarizing layer 12 having an absorption axes in a direction crossing the aligning treatment direction of the first alignment film 7 at an angle of substantially 45°, and a pair of base films 13 and 14 that are respectively formed on both surfaces of the first polarizing layer 12 to sandwich the first polarizing layer 12 therebetween, have a phase difference in a plane parallel to substrate surfaces of the pair of substrates 2 and 3 being substantially zero, have a phase difference in a plane perpendicular to the substrate surfaces of the pair of substrates 2 and 3 (which will be referred to as a phase difference in a thickness direction thereinafter), and are formed of a transparent resin film, e.g., a TAC (triacetylcellulose) film. The second polarizing plate 15 includes a second polarizing layer 16 having an absorption axis in a direction crossing the aligning treatment direction of the second alignment film 8 formed on the front substrate 8 at an angle of substantially 45°, and a pair of base films 17 and 18 that are provided on both surfaces of the second polarizing layer 16 to sandwich this second polarizing layer 16 therebetween, have a phase difference in a plane parallel to the substrate surfaces being substantially zero, have a phase difference in a plane perpendicular to the substrates (a phase difference in the thickness direction), and are formed of a transparent resin film, e.g., a TAC film.

The first and second viewing angle compensating plates 19 and 22, which are respectively arranged between the liquid crystal cell 1 and the pair of polarizing plates 11 and 15, respectively include viewing angle compensating layers 20 and 23 formed of a discotic liquid crystal layer in which discotic liquid crystal molecules are hybrid-aligned, and a pair of base films 21 and 24 that are formed of a transparent resin film, e.g., the TAC film, the base films 21 being provided on at least one surface of the viewing angle compensating layers 20 and the base films 24 being provided on at least one surface of the viewing angle compensating layers 23. Each of the viewing angle compensating layers 20 and 23 has a phase difference in a plane parallel with the substrate surfaces and a phase difference in a plane perpendicular to the substrate surfaces (a phase difference in the thickness direction). Furthermore, each of the pair of base films 21 and 24 has a phase difference in a plane parallel with the substrate surfaces being substantially zero and a phase difference in a plane perpendicular to the substrate surfaces (a phase difference in the thickness direction).

The first and second viewing angle compensating plates 19 and 22 used in this embodiment are obtained by providing the base film 21 and 24 on one surface of the viewing angle compensating layer 20 and 23, respectively.

Figure 7:
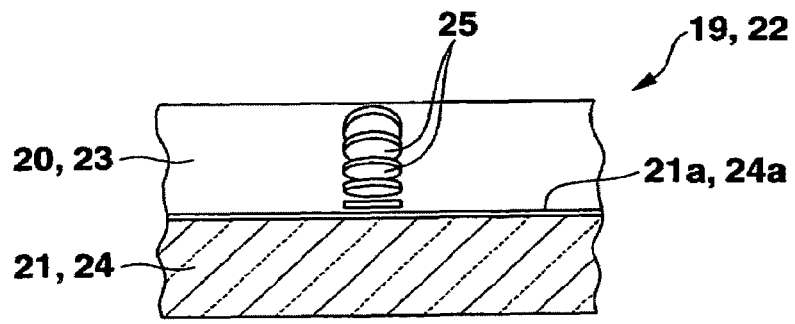
FIG. 7 is an enlarged cross-sectional view of a part of a viewing angle compensating plate.

FIG. 7 is an enlarged cross-sectional view of a part of the first and second viewing angle compensating plates 19 and 22, and the base films 21 and 24 are respectively provided with alignment films 21a and 24a that are subjected to an aligning treatment in one direction, the alignment film 21a being formed on one surface of the base film 21 and the alignment film 24a being formed on one surface of the base film 24, and the discotic liquid crystal layers are respectively provided on the alignment films 21a and 24a. In this discotic liquid crystal layer, the discotic liquid crystal molecules 25 are hybrid-aligned so that a molecular axis perpendicular to discotic surfaces of the discotic liquid crystal molecules 25 is placed on a plane perpendicular to a film surface of the base film 21 and parallel to the aligning treatment direction of the alignment film 21a and a tilt angle with respect to the base film 21 is sequentially increased from the base film 21 side toward its opposite side.

Each of the viewing angle compensating layer 20 and 23 of the first and second viewing angle compensating plate 19 and 22 has a negative optical anisotropy having an optical axis providing a minimum refractive index in an average tilt direction of the molecular axis in the plane where the molecular axes of the hybrid-aligned discotic liquid crystal molecules 25 are present. Here, a line on which the plane where the molecular axes of the discotic liquid crystal molecules 25 are present crosses the surface of the viewing angle compensating layer 20 and 23 is referred to as an optical axis direction.

Furthermore, the first viewing angle compensating plate 19 is arranged so that a surface of the first viewing angle compensating layer 20 of this viewing angle compensating plate 19 where a tilt angle of the discotic liquid crystal molecules 25 is large (a surface opposite to the base film 21 side) faces the outer surface of the rear substrate 2 of the liquid crystal cell 1. Moreover, the optical axis direction of the first viewing angle compensating layer 20 is set to parallel with a direction substantially parallel to or substantially perpendicular to the aligning treatment direction of the first alignment film 7 formed on the rear substrate 2. The second viewing angle compensating plate 22 is arranged so that a surface of the second viewing angle compensating layer 23 of this viewing angle compensating plate 22 where a tilt angle of the discotic liquid crystal molecules is large (a surface opposite to the base film 24 side) faces the outer surface of the front substrate 3 of the liquid crystal cell 1. Additionally, the optical axis direction of the second viewing angle compensating layer 23 is set to parallel with a direction substantially parallel to or substantially perpendicular to the aligning treatment direction of the second alignment film 8 formed on the front substrate 3.

Figure 8:
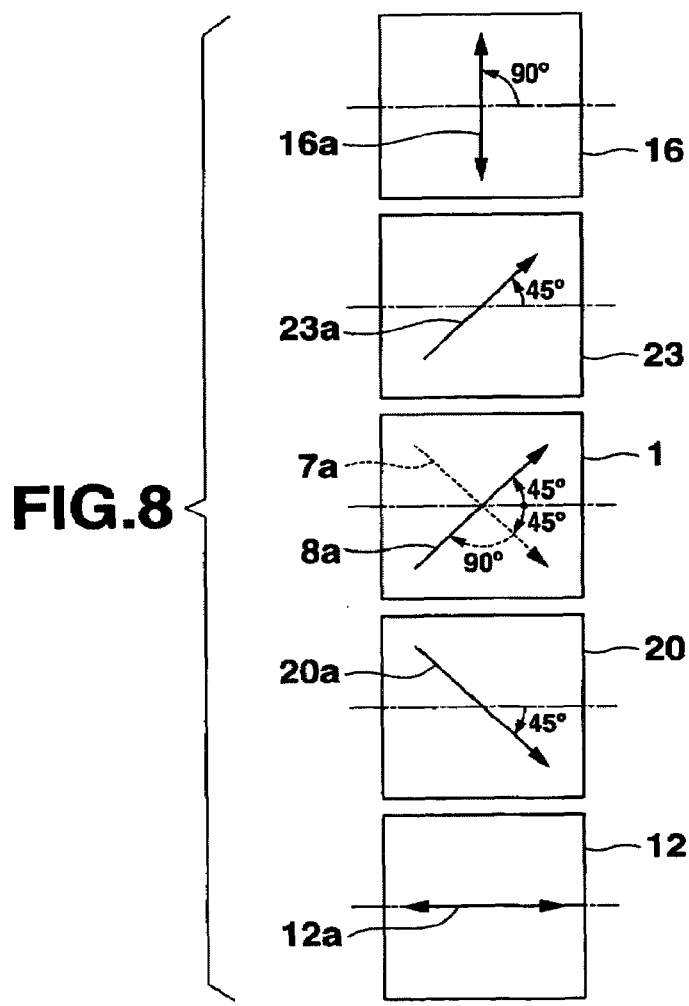
FIG. 8 is a view showing aligning treatment directions of first and second alignment films, directions of absorption axes of first and second polarizing layers, and directions of optical axes of first and second viewing angle compensating layers in the first embodiment.

FIG. 8 shows aligning treatment directions 7a and 8a of the first and second alignment films 7 and 8 of the liquid crystal cell 1, directions of absorption axes 12a and 16a of the polarizing layers 12 and 16 of the first and second polarizing plates 11 and 15, and directions of optical axis directions 20a and 23a of the viewing angle compensating layers 20 and 23 of the first and second viewing angle compensating plates 19 and 22.

As shown in FIG. 8, the first alignment film 7 formed on the rear substrate 2 of the liquid crystal cell 1 is aligned in a first direction crossing a lateral axis direction (a direction indicated by an alternate long and short dash line in the drawing) of a screen of the liquid crystal display device clockwise as seen from the observation side at an angle of substantially 45°. The second alignment film 8 formed on the front substrate 3 is aligned in a second direction (a direction crossing the lateral axis direction of the screen counterclockwise as seen from the observation side at an angle of substantially 45°) crossing the first direction at an angle of substantially 90°. The liquid crystal molecules 10a in the liquid crystal layer 10 held between the first alignment film 7 of the rear substrate 2 and the second alignment film 8 of the front substrate 3 are twist-aligned in a layer thickness direction of the liquid crystal layer 10 between the first alignment film 7 and the second alignment film 8 at a twisted angle of substantially 90° as indicated by an arrow of a dashed line that shows a twisted direction of a molecular orientation.

In the liquid crystal layer 10 of this liquid crystal cell 1, a value of a retardation apparently varies in the range of substantially λ/2 with respect to transmitted light in accordance with an alignment state of the liquid crystal molecules 10a that changes in accordance with a voltage applied to the liquid crystal layer 10 between the electrodes 4 and 5 on the pair of substrates 2 and 3.

The first polarizing plate 11 facing the outer surface of the rear substrate 2 of the liquid crystal cell 1 is arranged so that the absorption axis 12a of the first polarizing layer 12 of this polarizing plate 11 is set to parallel with the lateral axis direction of the screen, i.e., crossing the aligning treatment direction 7a of the first alignment film 7 of the rear substrate 2 counterclockwise as seen from the observation side at an angle of substantially 45°. The second polarizing plate 15 facing the outer surface of the front substrate 3 of the liquid crystal cell 1 is arranged so that the absorption axis 16a of the second polarizing layer 16 of this polarizing plate 15 is set to parallel with a direction (a direction substantially perpendicular to the lateral axis direction of the screen) substantially perpendicular to the absorption axis 12a of the polarizing layer 12 of the first polarizing plate 11.

Further, the first viewing angle compensating plate 19 between the rear surface 2 of the liquid crystal cell 1 and the first polarizing plate 11 is arranged so that the optical axis direction 20a of the first viewing angle compensating layer 20 of this viewing angle compensating plate 19 is set to parallel with a direction substantially parallel with the aligning treatment direction 7a of the first alignment film 7 of the rear substrate 2. The second viewing angle compensating plate 22 between the front substrate 3 of the liquid crystal cell 1 and the second polarizing plate 15 is arranged so that the optical axis direction 23a of the second viewing angle compensating layer 23 of this viewing angle compensating plate 22 is set to parallel with a direction substantially parallel with the aligning treatment direction 8a of the second alignment film 8 of the front substrate 3, i.e., a direction substantially perpendicular to the optical axis direction 20a of the viewing angle compensating layer 20 of the first viewing angle compensating plate 19.

This liquid crystal display device controls transmission of white illumination light emitted from a non-illustrated surface light source arranged on a rear side thereof (the opposite side of the observation side) by application of a voltage to the liquid crystal layer 10 between the electrodes 4 and 5 in accordance with each of the plurality of pixel portions, and irradiates light of three colors, i.e., red, green, and blue, colored by the color filters 6R, 6G, and 6B of three colors, i.e., red, green, and blue, corresponding to the plurality of pixel portions to the observation side, thereby displaying a color image.

This liquid crystal display device displays a color image having a good color balance because a ratio of the liquid crystal layer thickness $d_R$ of the pixel portion to which the red color filter 6R of the liquid crystal cell 1 is provided (which will be referred to as a red pixel portion hereinafter), the liquid crystal layer thickness $d_G$ of the pixel portion to which the green filter 6G is provided (which will be referred to as a green pixel portion hereinafter), and the liquid crystal layer thickness $d_B$ of the pixel portion to which the blue filter 6B is provided (which will be referred to as a blue pixel portion) is set to $d_R:d_G:d_B=1.1:1.0:0.9$.

Figure 9:
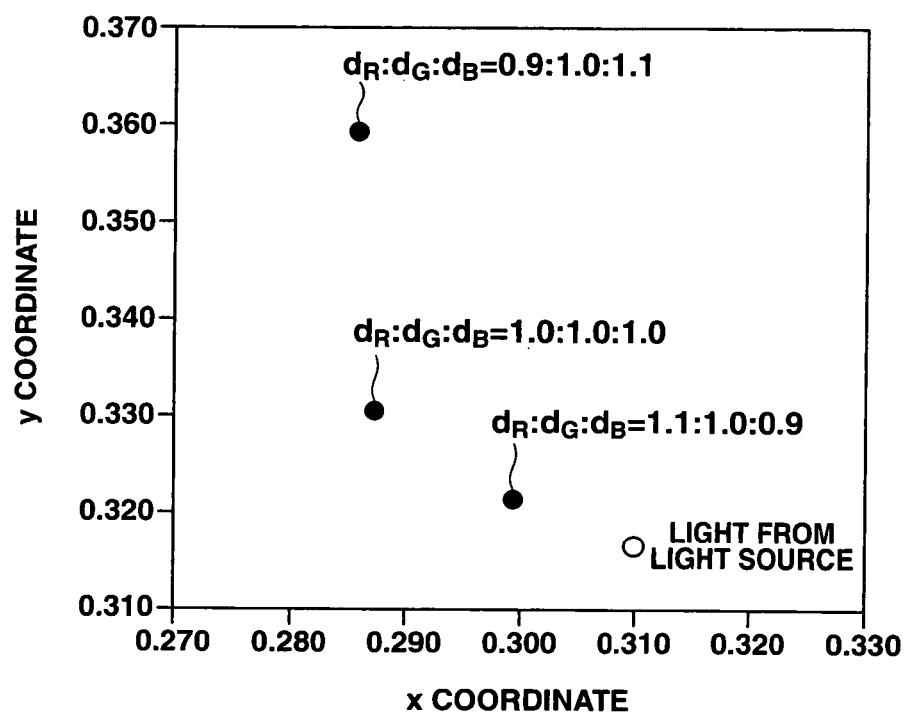
FIG. 9 is a view showing a relationship between a ratio of liquid crystal layer thicknesses $d_R$, $d_G$, and $d_B$ of pixel portions of respective colors, i.e., red, green, and blue and a display chromaticity when white is displayed in the liquid crystal display device according to the first embodiment.

That is, FIG. 9 shows a relationship between the ratio of the liquid crystal layer thickness $d_R$, $d_G$, and $d_B$ of the pixel portions having the respective colors, i.e., red, green, and blue, and a display chromaticity when light is emitted from each of the pixel portions having the colors, i.e., red, green, and blue, to display a white color.

As shown in FIG. 9, comparing examples where the ratio of the liquid crystal layer thicknesses $d_R$, $d_G$, and $d_B$ of the pixel portions having red, green, and blue colors is set to $d_R:d_G:d_B=0.9:1.0:1.1$, $d_R:d_G:d_B=1.0:1.0:1.0$, and $d_R:d_G:d_B=1.1:1.0:0.9$ with each other, a white display chromaticity when the ratio of the liquid crystal layer thicknesses $d_R$, $d_G$, and $d_B$ of the pixel portions having the respective colors is set to $d_R:d_G:d_B=1.1:1.0:0.9$ is a chromaticity close to that of light from a light source (white illumination light from the surface light source) as compared with a white display chromaticity when the ratio of the liquid crystal layer thicknesses $d_R$, $d_G$, and $d_B$ is set to any other value, and hence a color image having a good color balance is displayed.

It is to be noted that this liquid crystal display device is of a normally white type where the first polarizing plate 11 and the second polarizing plate 15 are arranged so that the absorption axes 12a and 16a of the respective polarizing layers 12 and 16 become substantially perpendicular to each other. This liquid crystal display device displays white when no voltage is applied to the liquid crystal layer 10 between the electrodes 4 and 5 of each pixel portion, and displays black when a voltage that is sufficiently high for the substantially all liquid crystal molecules 10a in the layer thickness direction of the liquid crystal layer 10 to rise to be aligned substantially perpendicularly with respect to the substrate surfaces (which will be referred to as a saturation voltage) is applied to the liquid crystal layer 10 between the electrodes 4 and 5 of each pixel portion.

In the liquid crystal cell 1 having the liquid crystal layer 10 in which the liquid crystal molecules 10a are twist-aligned with a twisted angle of substantially 90° between the pair of substrates 2 and 3, a behavior of the liquid crystal molecules 10a in the liquid crystal layer 10 near the pair of substrates 2 and 3 is suppressed by an anchoring effect of the alignment films 7 and 8. Thus, even when the saturation voltage is applied to the liquid crystal layer 10 between the electrodes 4 and 5, the liquid crystal molecules 10a near the pair of substrates 2 and 3 do not rise to be aligned, and an in-plane retardation (which will be referred to as a residual retardation) due to the liquid crystal molecules 10a in the liquid crystal layer 10 near the substrates 2 and 3 is present.

Furthermore, when the saturation voltage is applied to the liquid crystal layer 10 between the electrodes 4 and 5, the liquid crystal layer 10 has a negative phase difference (which will be referred to as a phase difference in the liquid crystal layer thickness direction) in a plane perpendicular to the substrate surfaces.

In the liquid crystal display device in which the first and second polarizing plates 11 and 15 are arranged so that the absorption axes 12a and 16a of the polarizing layers 12 and 16 is set to parallel with a direction forming an angle of substantially 45° with respect to the aligning treatment directions 7a and 8a of the alignment films 7 and 8 in particular, the phase difference in the liquid crystal layer thickness direction greatly functions with respect to light that obliquely enters the substrate surfaces, thereby reducing viewing angle characteristics.

Thus, in the liquid crystal display device according to this embodiment, the first and second viewing angle compensating plates 19 and 22 are respectively arranged between the first and second polarizing plates 11 and 15 arranged on the front and the rear sides of the liquid crystal cell 1 and the rear substrate 2 and the front substrate 3 of the liquid crystal cell 1 so that the first and second viewing angle compensating plates 19 and 22 cancel out the residual retardation. Moreover, the phase difference of the liquid crystal layer 10 in the plane perpendicular to the substrate surfaces when the saturation voltage (a voltage sufficiently high for the liquid crystal molecules 10a to rise to be aligned) is applied to the liquid crystal layer 10 between the electrodes 4 and 5 of the liquid crystal cell 1 is canceled out by the phase differences of the plurality of optical layers within the plane perpendicular to the substrate surfaces. The plurality of optical layers include the base films 14 and 18 on the surfaces of the first and second polarizing plates 11 and 15 facing the liquid crystal cell 1 between the first polarizing layer 12 of the first polarizing plate 11 and the second polarizing layer 16 of the second polarizing plate 15, the respective viewing angle compensating layers 20 and 23 of the first and second viewing angle compensating plates 19 and 22, and the base films 21 and 24 of the first and second viewing angle compensating plates 19 and 22.

That is, a value of a product of the phase difference of the liquid crystal layer 10 in the liquid crystal layer thickness direction and the liquid crystal layer thickness (an average value of the liquid crystal layer thicknesses $d_R$, $d_G$, and $d_B$ of the pixel portions having the respective colors to which the red, the green, and the blue color filters 6R, 6G, and 6B are provided) d is determined as a retardation in the liquid crystal layer thickness direction, and a value of a product of the phase difference in the thickness direction of each of the plurality of optical layers and each layer thickness is determined as a retardation in the thickness direction. At this time, when a value obtained by adding the retardation in the liquid crystal layer thickness direction and the retardations in the thickness direction of the plurality of the optical layers is set to fall within the range of −80 nm to +80 nm (0±80 nm), or preferably to 0 nm, the retardation in the thickness direction of the liquid crystal layer 10 at the time of application of the saturation voltage is canceled out.

Figure 10:
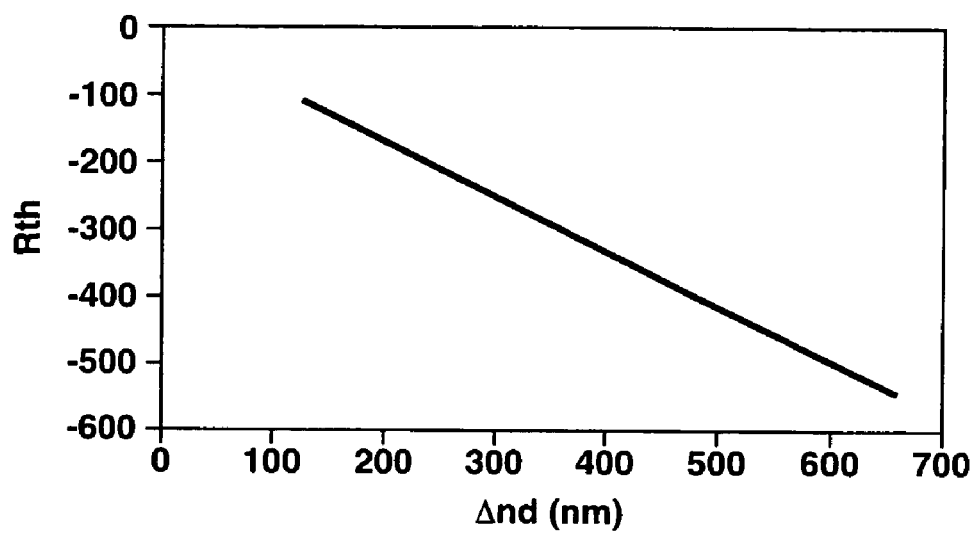
FIG. 10 is a view showing a relationship between $\Delta nd$ of a liquid crystal layer and a retardation $Rth_{LC}$ in a thickness direction of the liquid crystal layer when a saturation voltage is applied in the liquid crystal display device according to the first embodiment.

FIG. 10 shows a relationship between a product Δnd of an anisotropic refractive index Δn and the liquid crystal layer thickness d of a liquid crystal material constituting the liquid crystal layer 10 and a liquid crystal layer thickness direction retardation $Rth_{LC}$ of the liquid crystal layer 10 when the saturation voltage is applied on the assumption that a pre-tilt angle of the liquid crystal molecules 10a is 5.5° and the saturation voltage is 4V. The liquid crystal layer thickness direction retardation $Rth_{LC}$ of the liquid crystal layer 10 when the saturation voltage is applied varies as shown in the drawing in accordance with a value of the product Δnd of the liquid crystal layer 10. That is, the retardation $Rth_{LC}$ in the liquid crystal layer thickness direction linearly varies with respect to a change in a value of the product Δn of the liquid crystal layer 10. Thus, the retardation $Rth_{LC}$ is obtained by multiplying the value of the product Δnd of the liquid crystal layer 10 by a coefficient corresponding to an inclination of the straight line depicted in FIG. 10.

Thus, it is good enough to set an absolute value obtained by adding values of the retardations in the thickness direction of the plurality of optical layers excluding the liquid crystal layer 10 between the first polarizing layer 12 of the first polarizing plate 11 and the second polarizing layer 16 of the second polarizing plate 15 to match with an absolute value obtained by multiplying a value of Δnd of the liquid crystal layer 10 by a coefficient preset in accordance with the pre-tilt angle of the liquid crystal molecules 10a and the saturation voltage, or set a difference between the respective absolute values to fall within the range of −80 nm to +80 nm.

The next Table 1 shows a relationship between the retardation $Rth_{LC}$ in the liquid crystal layer thickness direction of the liquid crystal layer 10 having the liquid crystal molecules 10a with a pre-tilt angle and a saturation voltage being changed and a coefficient value that is multiplied with respect to a value Δnd of the liquid crystal layer to calculate a value of the retardation in the thickness direction of each of the plurality of optical layers.

TABLE 1

| Pre-tilt | Saturation voltage | $Rth_{LC}$ | Coefficient |
|---|---|---|---|
| 0.5° | 3 V | −299.43 | 0.72 |
| 5.5° | 3 V | −311.03 | 0.75 |
| 10.5° | 3 V | −321.85 | 0.77 |
| 0.5° | 4 V | −338.46 | 0.81 |
| 5.5° | 4 V | −345.40 | 0.83 |
| 10.5° | 4 V | −352.11 | 0.85 |
| 0.5° | 5 V | −358.35 | 0.86 |
| 5.5° | 5 V | −363.41 | 0.87 |
| 10.5° | 5 V | −368.32 | 0.86 |

As shown in Table 1, when the pre-tilt angle of the liquid crystal molecules 10a falls within the range of 0.50° to 10.50° and the saturation voltage falls within the range of 3V to 5V, a value of the retardation in the liquid crystal layer thickness direction of the liquid crystal layer 10 at the time of applying the saturation voltage is calculated by multiplying a coefficient falling within the range of 0.72 to 0.86 by a value of Δnd of the liquid crystal layer. Here, the value of the retardation in the liquid crystal thickness direction of the liquid crystal layer 10 at the time of applying the saturation voltage and a total value of the retardations in the thickness direction of the plurality of optical layers excluding the liquid crystal layer 10 have substantially the same absolute values, and have opposite signs.

Thus, in this embodiment, the total value of the retardations in the thickness direction of the plurality of optical layers between the first polarizing layer 12 and the second polarizing layer 16 excluding the liquid crystal layer 10 is set to a value obtained by multiplying the value of Δnd of the liquid crystal layer 10 by a coefficient falling within the range of 0.72 to 0.86, and a total value of the values of the retardations in the thickness direction of the plurality of optical layers excluding the liquid crystal layer 10 and the retardation in the liquid crystal layer thickness direction of the liquid crystal layer 10 at the time of applying the saturation voltage is set to fall within the range of 0±80 nm (−80 nm to +80 nm). In this case, as the value of the retardation in the liquid crystal layer thickness direction of the liquid crystal layer 10 at the time of applying the saturation voltage, a value obtained by multiplying a coefficient 0.83 by the value of Δnd of the liquid crystal layer 10.

Figure 11:
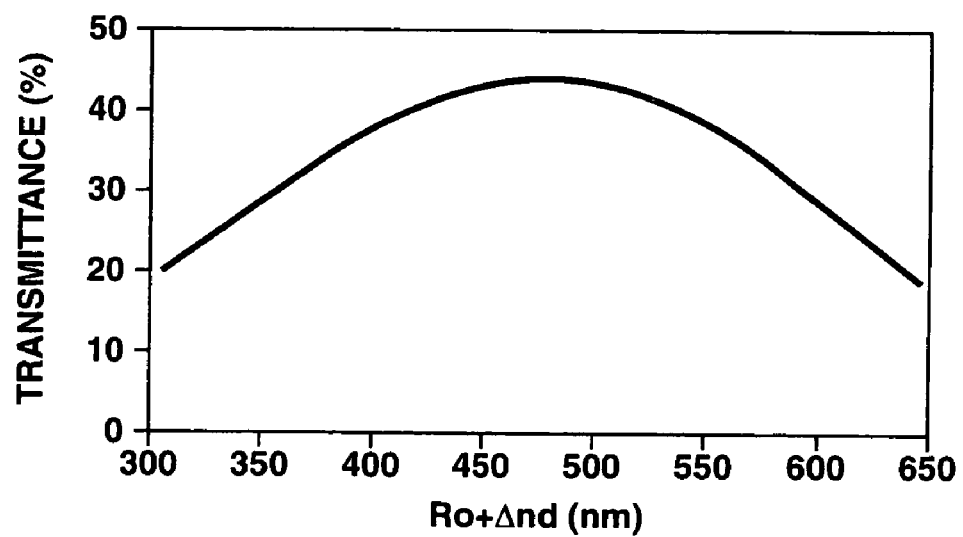
FIG. 11 is a view showing a relationship between an in-plane retardation Ro, $\Delta nd$ of the liquid crystal layer, and a transmittance, the in-plane retardation Ro being obtained by adding respective in-plane retardation values of base films of a plurality of optical layers between the first and second polarizing layers excluding the liquid crystal layer in the liquid crystal display device according to the first embodiment.

Additionally, FIG. 11 shows a transmittance of the liquid crystal display device with respect to a value Ro+Δnd that is obtained by adding an in-plane retardation Ro acquired by adding values of in-plane retardations of the plurality of optical layers excluding the liquid crystal layer 10 between the first polarizing layer 12 of the first polarizing plate 11 and the second polarizing layer of the second polarizing plate in the liquid crystal display device to the product Δnd of the liquid crystal layer 10. The plurality of optical layers include the base films 14 and 18 on the surfaces of the first and second polarizing plates 11 and 15 facing the liquid crystal cell 1, the viewing angle compensating layers 20 and 23 of the first and second viewing angle compensating plates 19 and 22, and the base films 21 and 24 of the first and second viewing angle compensating plates 19 and 22. The liquid crystal display device demonstrates a high transmittance when a value of Ro+Δnd falls within the range of 350 nm to 600 nm, and a peak when a value of Ro+Δnd is 480 nm in particular.

Thus, in this embodiment, a value obtained by adding a total value of the in-plane retardations each of which is a product of an in-plane phase difference in a plane parallel to the substrate surfaces of each of the plurality of optical layers between the first polarizing layer 12 and the second polarizing layer 16 and a layer thickness of the optical layer to Δnd of the liquid crystal layer 10 is set to the range of 350 nm to 600 nm, or preferably 480 nm.

In more detail, in the liquid crystal display device according to this embodiment, an optical function of the base films 13 and 17 placed outside the first and second polarizing layers 12 and 16 of the first and second polarizing plates 11 and 15 does not concern visibility of an observer. Further, the plurality of optical layers between the first polarizing layer 12 and the second polarizing layer 16 concern visibility of the observer, the plurality of optical layers including the base films 14 and 18 of the first and second polarizing plates 11 and 15, the first and second viewing angle compensating layers 20 and 23 of the first and second viewing angle compensating plates 19 and 22, the base films 21 and 24 of these compensating layers 20 and 23, and the liquid crystal layer 10.

Figure 18:
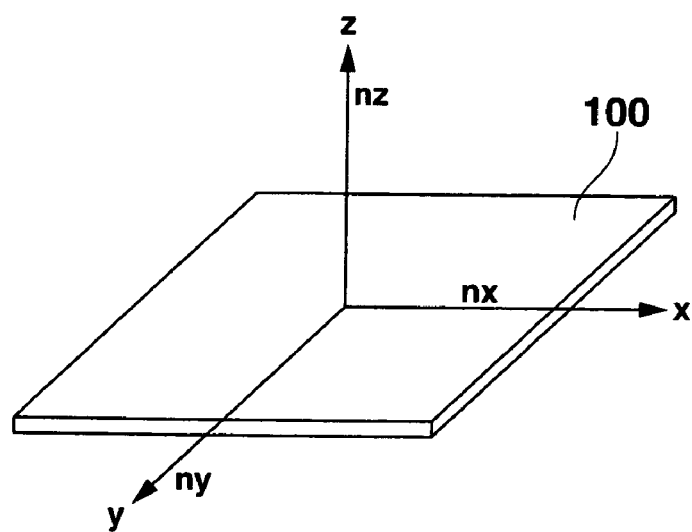
FIG. 18 is a perspective view for explaining characteristics of an optical film in the liquid crystal display device according to the third embodiment.

As depicted in FIG. 18 showing X, Y, and Z coordinates of an optical medium 100 and refractive indices in respective coordinate axis directions, in regard to each of the plurality of optical layers of the optical medium 100, assuming that one and the other of two directions perpendicular to each other on a plane parallel to the substrate surfaces are an X axis and a Y axis, a thickness direction perpendicular to the substrate surfaces is a Z axis, a refractive index in the X axis direction is nx, a refractive index in the Y axis direction is ny, a refractive index in the Z axis direction is nz, and a layer thickness of the optical layer is d, a retardation Rthi in the thickness direction of each optical layer is expressed as $\{(nx+ny)/2-nz\}\cdot d$. Assuming that Rth is a total retardation in the thickness direction obtained by adding values of the retardations Rthi in the thickness direction of these optical layers and Δnd is a product of an anisotropic refractive index Δn of a liquid crystal material constituting the liquid crystal layer 10 and an average liquid crystal layer thickness d, the total retardation Rth in the thickness direction is set to fall within the range satisfying the following expression:

$Rth=0.83\Delta nd \pm 80$ nm.

That is, the total retardation Rth in the thickness direction is set to fall within the range of 0.83Δnd−80 nm to 0.83Δnd+80 nm.

Furthermore, in retard to the plurality of optical layers between the first polarizing layer 12 and the second polarizing layer 16, assuming that Roi is an in-plane retardation of each optical layer expressed as $(nx-ny)\cdot d$ and Ro is an in-plane retardation obtained by adding values of in-plane retardations Roi of the respective optical layers, the totalized in-plane retardation Ro is set to the range satisfying the following expression:

$Ro+\Delta nd=350$ nm to 600 nm.

In the liquid crystal display device according to this embodiment, a value of Δnd of the liquid crystal layer 10 of the liquid crystal cell 1 is 380 nm; values of the retardation Rthi in the thickness direction and the in-plane retardation Roi of the first and the second viewing angle compensating layers 20 and 23, Rthi=70 nm and Roi=−47 nm; values of the retardation Rthi in the thickness direction and the in-plane retardation Roi of the base films 14 and 18 on the surfaces of the first and second polarizing layers 12 and 16 facing the liquid crystal cell 1 and the base films 21 and 24 of the first and second viewing angle compensating layers 20 and 23, Rthi=89 mm and Roi=9 nm.

Thus, the retardation Rth in the thickness direction obtained by adding values of the retardations Rthi in the thickness direction, which is expressed as $\{(nx+ny)/2-nz\}\cdot d$, of the plurality of the optical layers between the first polarizing layer 12 and the second polarizing layer 16 excluding the liquid crystal layer 10 is 353 nm, and the in-plane retardation Ro obtained by adding values of the in-plane retardations Roi of the plurality of optical layers is 12 nm. Accordingly, the value 0.83Δnd obtained by multiplying the value of Δnd of the liquid crystal layer 10 by the preferable coefficient 0.83 is 315 nm, and the value 353 nm as the added retardation Rth in the thickness direction falls within the range of a value obtained by adding 80 nm to −315 nm or +315 nm as a value of 0.83Δnd. Furthermore, the value obtained by totalizing the added in-plane retardation Ro and Δnd is 392 nm, and falls within the range of 350 nm to 600 nm that defines the range of Ro+Δnd.

Since this liquid crystal display device has the above-explained structure, angle dependency of the transmittance is improved, and a display wide viewing angle is increased. Further, in the television receiver using this liquid crystal display device, its viewing angle is increased.

Figure 12A:
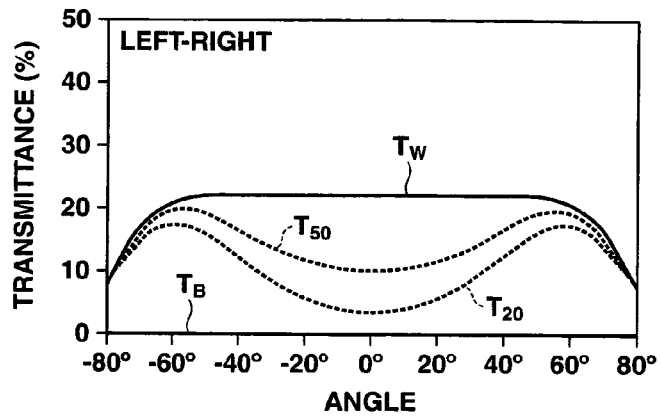
FIGS. 12A to 12D are viewing angle characteristic views at the time of white display $T_W$, black display $T_B$, 50% gradation (a gradation with 50% brightness of white display) display $T_{50}$, and 20% gradation (a gradation with 20% brightness of white display) display $T_{20}$ in the liquid crystal display device according to the first embodiment.
Figure 12B:
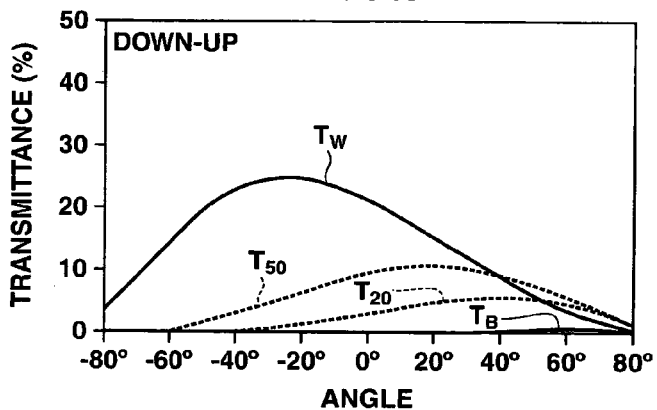
Figure 12C:
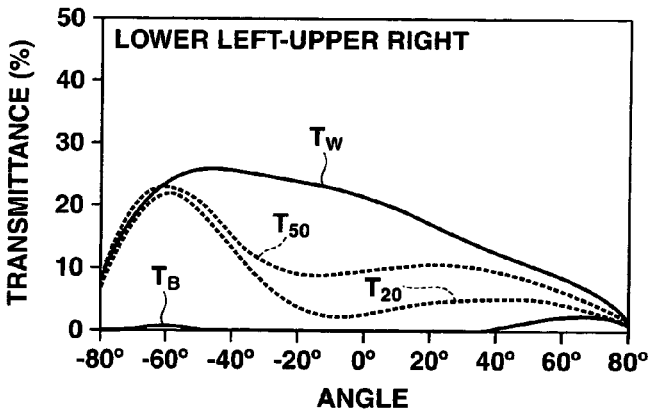
Figure 12D:
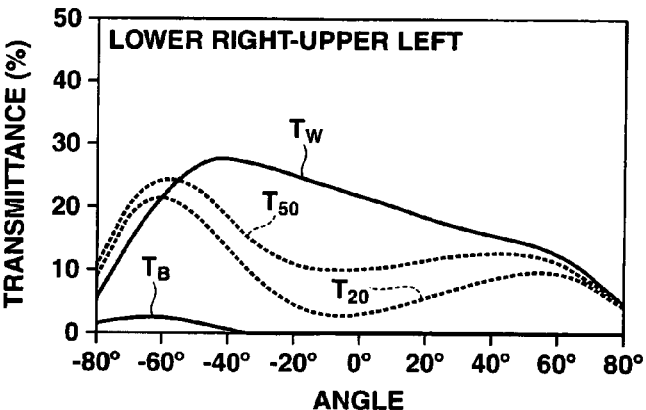

FIGS. 12A to 12D are viewing angle characteristic views at the time of white display $T_W$, black display $T_B$, 50% gradation (a gradation with 50% brightness of white display) display $T_{50}$, and 20% gradation (a gradation with 20% brightness of white display) display $T_{20}$ of the liquid crystal display device. FIG. 12A shows viewing angle characteristics in a right-and-left direction of the screen, FIG. 12B shows viewing angle characteristics in an up-and-down direction of the screen, FIG. 12C shows viewing angle characteristics in a direction from a lower left side to a lower right side of the screen, and FIG. 12D shows viewing angle characteristics in a direction from a lower right side to an upper left side of the screen.

It is to be noted that a negative angle is an angle in the left direction and a positive angle is an angle in the right direction in FIG. 12A. In FIG. 12B, a negative angle is an angle in the lower direction a positive angle is an angle in the upper direction. In FIG. 12C, a negative angle is an angle in the lower left direction and a positive angle is an angle in the upper right direction. In FIG. 12D, a negative angle is an angle in the lower right direction and a positive angle is an angle in the upper left direction.

As shown in FIGS. 12A to 12D, the liquid crystal display device has the viewing angle characteristics that the angle dependency of a transmittance in each direction, i.e., the right-and-left direction, the up-and-down direction, the direction from the lower left to the lower right, and the direction from the lower right to the upper left in the screen is improved, i.e., inversion of the intermediate gradation does not occur in a wide angle range in each of these directions. The television receiver using this liquid crystal display device has wide viewing angles in a right-and-left direction, a direction from the lower left to the lower right, and a direction from the lower right to the upper left in particular.

Modification of First Embodiment

It is to be noted that a value of Δnd of the liquid crystal layer 10 in the liquid crystal cell 1 is set to 380 nm in the liquid crystal display device, but the value of Δnd of the liquid crystal layer 10 may be set to any other value.

Figure 13A:
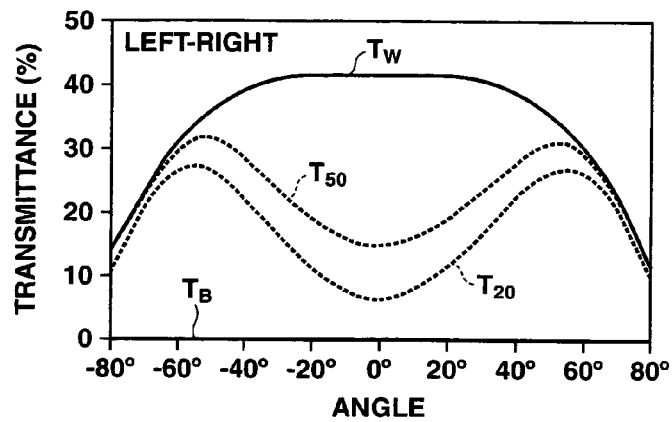
FIGS. 13A to 13D are viewing angle characteristic views at the time of white display $T_W$, black display $T_B$, 50% gradation (a gradation with 50% brightness of white display) display $T_{50}$, and 20% gradation (a gradation with 20% brightness of white display) display $T_{20}$ in the liquid crystal display device according to a modification of the first embodiment.
Figure 13B:
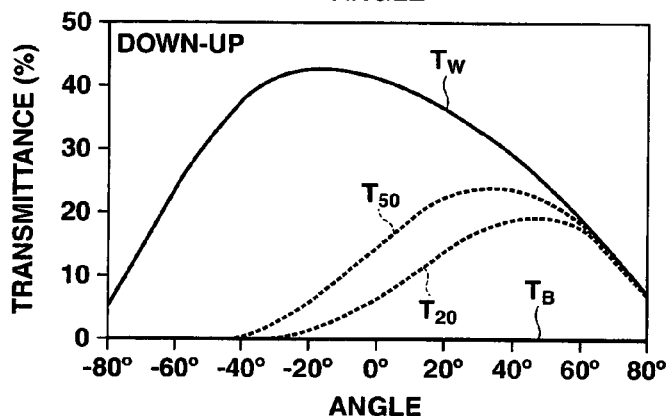
Figure 13C:
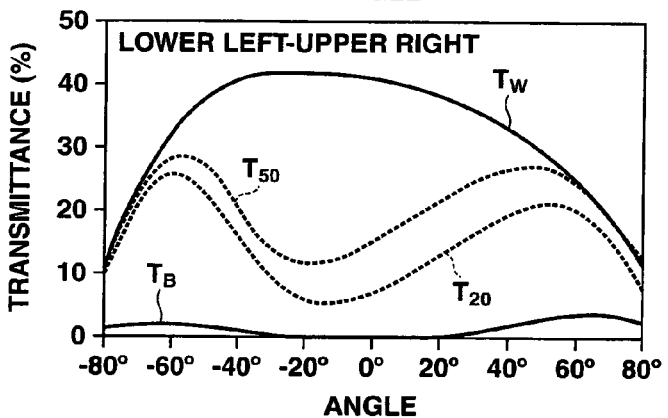
Figure 13D:
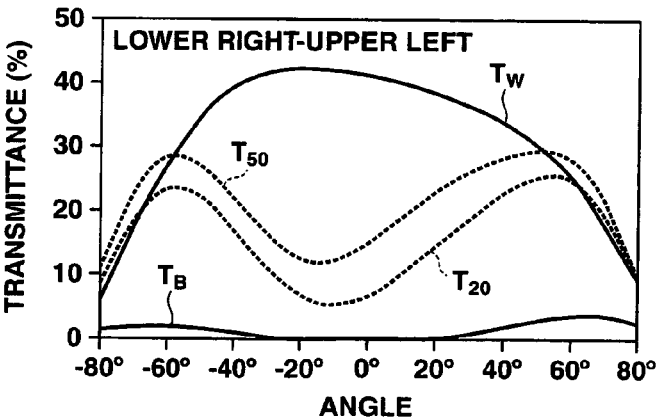

FIGS. 13A to 13D are viewing angle characteristic views at the time of white display $T_W$, black display $T_B$, 50% gradation display $T_{50}$, and 20% gradation display $T_{20}$ in a liquid crystal display device in which a value of Δnd of the liquid crystal layer 10 is set to 505 nm and the other structures are the same as those in the foregoing embodiment. FIG. 13A shows viewing angle characteristics in the right-and-left direction of the screen, FIG. 13B shows viewing angle characteristics in the up-and-down direction of the screen, FIG. 13C shows viewing angle characteristics in the direction from the lower left to the lower right of the screen, and FIG. 13D shows viewing angle characteristics in the direction from the lower right to the upper left of the screen.

As shown in FIGS. 13A to 13D, the liquid crystal display device according to this modification has viewing angle characteristics that angle dependency of a transmittance in each direction, i.e., the right-and-left direction, the up-and-down direction, the direction from the lower left to the lower right, and the direction from the lower right to the upper left in the screen is improved and inversion of the intermediate gradation does not occur in a wide angle range in each of these directions. Moreover, contrast is higher than that of the liquid crystal display device according to the foregoing embodiment.

Second Embodiment

Figure 14:
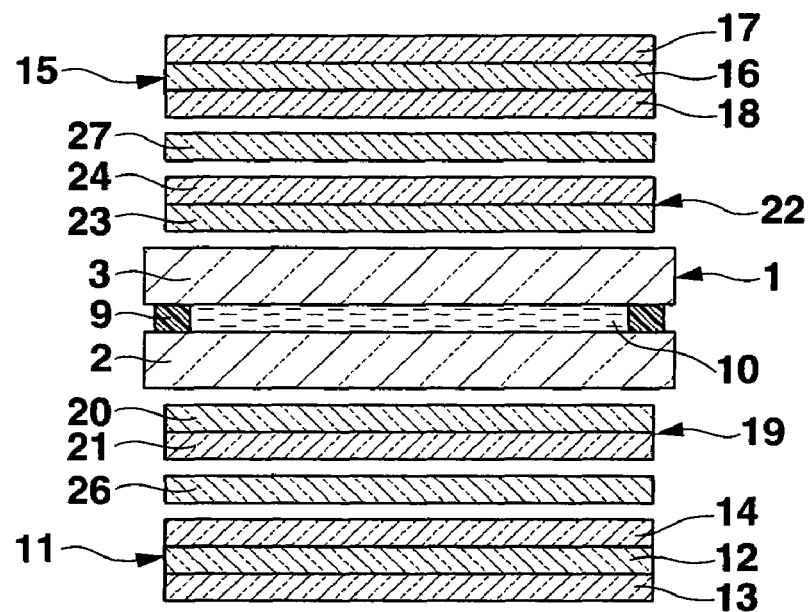
FIG. 14 is a schematic cross-sectional view of a liquid crystal display device used in a second embodiment of the present invention.
Figure 15:
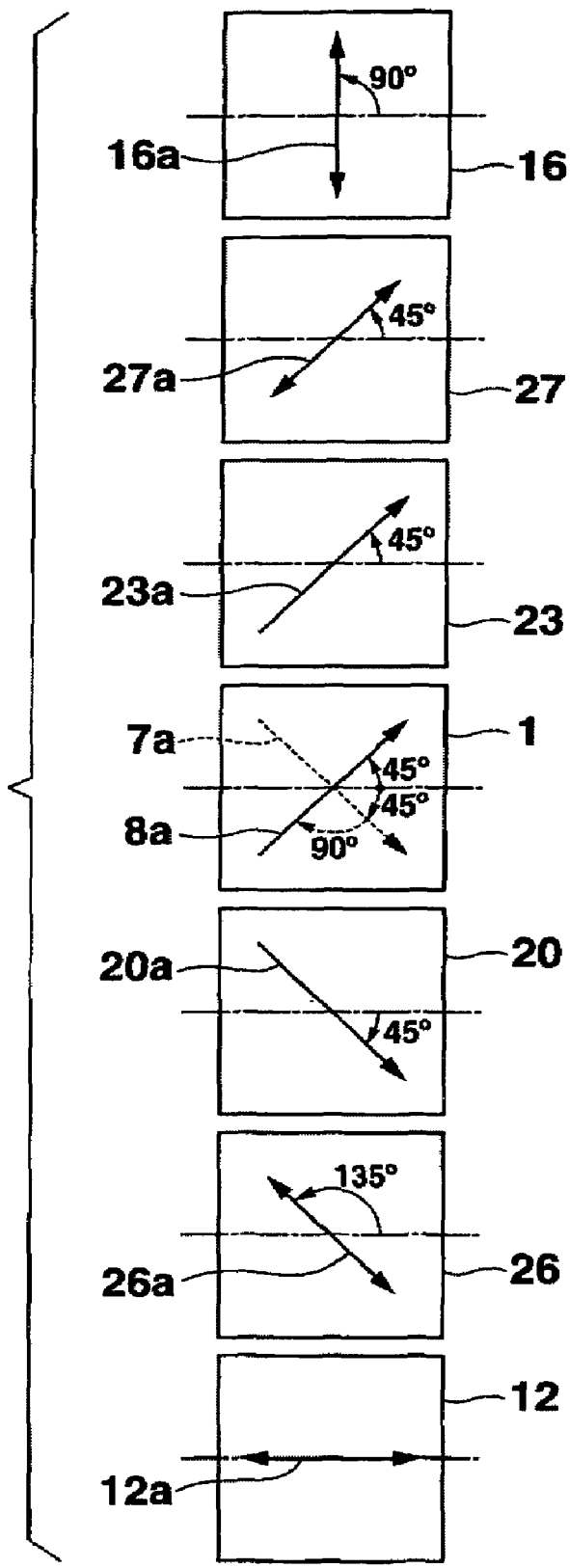
FIG. 15 is a view showing aligning treatment directions of first and second alignment films, directions of absorption axes of first and second polarizing layers, directions of optical axes of first and second viewing angle compensating layers, and directions of retardation axes of first and second retardation plates in the liquid crystal display device according to the second embodiment.

FIGS. 14 to 16 show a second embodiment according to the present invention, and FIG. 14 is a schematic cross-sectional view of a liquid crystal display device used in the second embodiment.

The liquid crystal display device according to this embodiment has a structure where a first retardation plate 26 is arranged between the first polarizing plate 11 and the first viewing angle compensating plate 19 and a second retardation plate 27 is arranged between the second polarizing plate 15 and the second viewing angle compensating plate 22 in the liquid crystal display device according to the first embodiment. A plurality of optical layers between a first polarizing layer 12 and a second polarizing layer 16 excluding a liquid crystal layer 10 include base films 14 and 18 on surfaces of the first and second polarizing layers 12 and 16 facing a liquid crystal cell 1, the first and second viewing angle compensating layers 20 and 23, base films 21 and 24 of these compensating layers 20 and 23, and the first and second retardation plates 26 and 27. It is to be noted that other structures of the liquid crystal display device according to this embodiment are substantially the same as those in the first embodiment.

FIG. 15 shows aligning treatment directions 7a and 8a of first and second alignment films 7 and 8 of the liquid crystal cell 1, directions of absorption axes 12a and 16a of the polarizing layers 12 and 16 of the first and second polarizing plates 11 and 15, optical axis directions 20a and 23a of the viewing angle compensating layers 20 and 23 of the first and second viewing angle compensating plates 19 and 22, and directions of retardation axes 26a and 27a of the first and second retardation plates 26 and 27 in the liquid crystal display device according to this embodiment.

As shown in FIG. 15, the aligning treatment directions 7a and 8a of the first and second alignment films 7 and 8 of the liquid crystal cell 1, the directions of the absorption axes 12a and 16a of the polarizing layers 12 and 16 of the first and second polarizing plates 11 and 15, and the optical axis directions 20a and 23a of the viewing angle compensating layers 20 and 23 of the first and second viewing angle compensating plates 19 and 22 are the same as those in the first embodiment. The first retardation plate 26 is arranged so that its retardation axis 26a is set to parallel with a direction substantially parallel with the optical axis direction 20a of the first viewing angle compensating layer 20 of the first viewing angle compensating plate 19. The second retardation plate 27 is arranged so that its retardation axis 27a is set to parallel with a direction substantially parallel with the optical axis direction 23a of the second viewing angle compensating layer 23 of the second viewing angle compensating plate 22.

Additionally, in this embodiment, a value of Δnd of the liquid crystal layer 10 of the liquid crystal cell 1 is set to 420 nm, and values of a retardation Rthi in a thickness direction and an in-plane retardation Roi of each of the first and second viewing angle compensating layers 20 and 23 are set to Rthi=70 nm and Roi=−47 nm. Further, values of a retardation Rthi in the thickness direction and an in-plane retardation Roi of each of base films 14 and 18 of the first and second polarizing layers 12 and 16 facing the liquid crystal cell 1 and each of base films 21 and 24 of the first and second viewing angle compensating layers 20 and 23 are set to Rthi=89 nm and Roi=9 nm. Furthermore, values of a retardation Rthi in the thickness direction and an in-plain retardation Roi of each of the first and second retardation plates 26 and 27 are set to Rthi=175 nm and Roi=35 nm. As explained above, a total value of the retardation value in the thickness direction of each of the plurality of optical layers between the first polarizing layer 12 and the second polarizing layer 16 excluding the liquid crystal layer 10 and the retardation value in the liquid crystal layer direction of the liquid crystal layer 10 at the time of applying a voltage is set to the range of −80 nm to +80 nm.

Figure 16A:
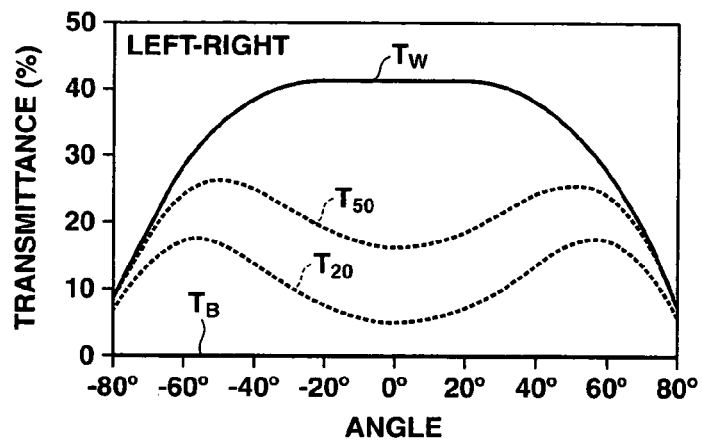
FIGS. 16A to 16D are viewing angle characteristic views at the time of white display $T_W$, black display $T_B$, 50% gradation (a gradation with 50% brightness of white display) display $T_{50}$, and 20% gradation (a gradation with 20% brightness of white display) of display $T_{20}$ in the liquid crystal display in the liquid crystal display device according to the second embodiment.
Figure 16B:
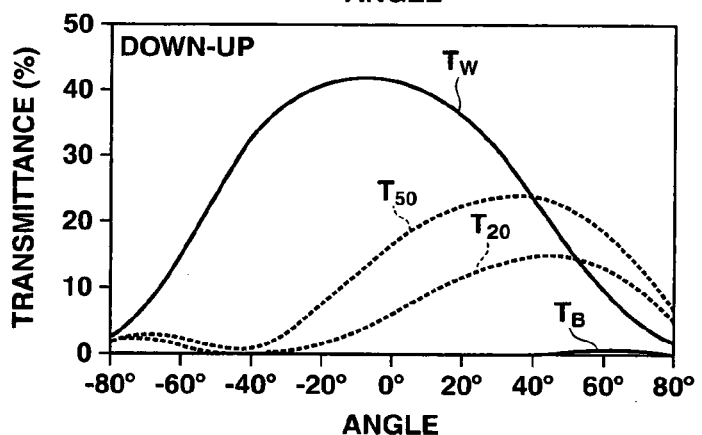
Figure 16C:
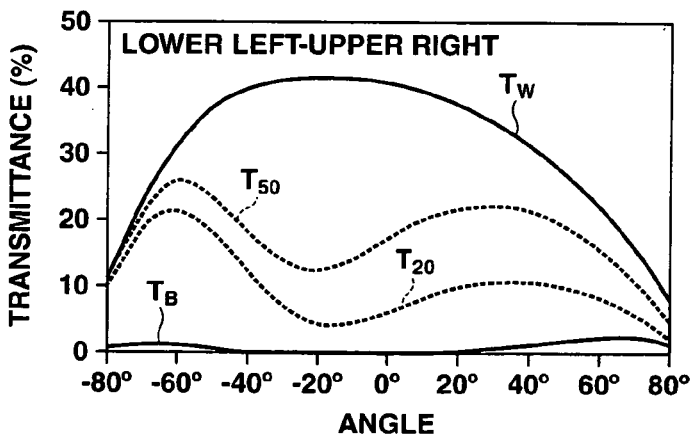
Figure 16D:
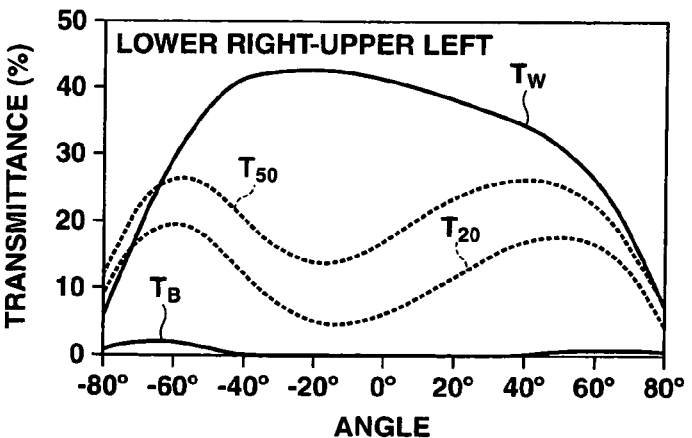

FIGS. 16A to 16D are viewing angle characteristic views at the time of white display $T_W$, black display $T_B$, 50% gradation display $T_{50}$, and 20% gradation display $T_{20}$ of the liquid crystal display device according to this embodiment. FIG. 16A shows viewing angle characteristics in a right-and-left direction of a screen, FIG. 16B shows viewing angle characteristics in an up-and-down direction of the screen, FIG. 16C shows viewing angle characteristics in a direction from the lower left to the lower right of the screen, and FIG. 16D shows viewing angle characteristics in a direction from the lower right to the upper left of the screen.

As shown in FIGS. 16A to 16D, in the liquid crystal display device according to this embodiment, angle dependency of a transmittance in each direction, i.e., the right-and-left direction, the up-and-down direction, the direction from the lower left to the lower right, and the direction from the lower right to the upper left of the screen is improved. Furthermore, this liquid crystal display device has viewing angle characteristics that inversion of the intermediate gradation does not occur in a wide angle range in each of these directions, and a viewing angle is wide and contrast is high in the right-and-left direction, the direction from the lower left to the lower right, and the direction from the lower right to the upper left.

Third Embodiment

Figure 17:
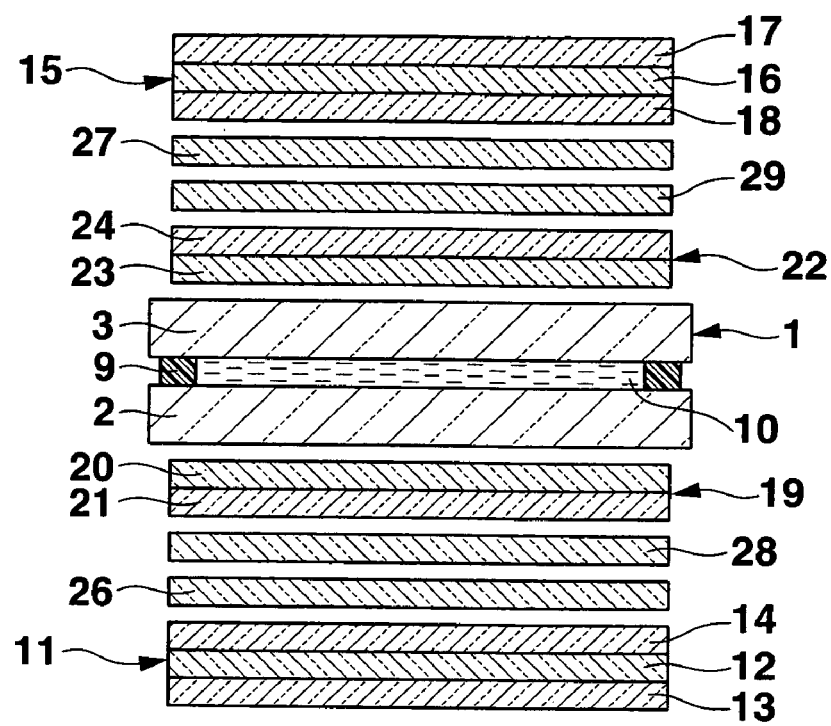
FIG. 17 is a schematic cross-sectional view of a liquid crystal display device used in a third embodiment according to the present invention.

FIGS. 17, 19, and 20 show a third embodiment according to the present invention, and FIG. 17 is a schematic cross-sectional view of a liquid crystal display device used in the third embodiment.

The liquid crystal display device according to this embodiment has a structure where first and second optical films 28 and 29 having a phase difference are further arranged between the first retardation plate 26 and the first viewing angle compensating plate 19 and between the second retardation plate 27 and the second viewing angle compensating plate 22 in the liquid crystal display device according to the second embodiment. A plurality of optical layers between a first polarizing layer 12 and a second polarizing layer 16 excluding a liquid crystal layer 10 include base films 14 and 18 on surfaces of the first and second polarizing layers 12 and 16 facing a pair of substrates 2 and 3 of a liquid crystal cell 1, the first and second viewing angle compensating layers 20 and 23 and their base films 21 and 24, the first and second retardation plates 26 and 27, and the first and second optical films 28 and 29. It is to be noted that other structures of the liquid crystal display device according to this embodiment are substantially the same as those of the second embodiment.

As shown in FIG. 18, in each of the first and second optical films 28 and 29 as an optical medium 100, a relationship between one refractive index nx and the other refractive index ny in two directions x and y perpendicular to each other in a plane parallel to a film surface of each of the first and second optical films 28 and 29, i.e., parallel to substrate surfaces of the liquid crystal cell 1, and a refractive index nz in a thickness direction z perpendicular to the film surface (the substrate surfaces of the liquid crystal cell 1) is nx=ny>nz.

That is, each of the first and second optical films 28 and 29 is a retardation film having an optical axis in the thickness direction z perpendicular to the film surface.

FIG. 19 shows aligning treatment directions 7a and 8a of the first and second alignment films 7 and 8 of the liquid crystal cell 1, directions of absorption axes 12a and 16a of the polarizing layers 12 and 16 of the first and second polarizing plates 11 and 15, optical axis directions 20a and 23a of the viewing angle compensating layers 20 and 23 of the first and second viewing angle compensating plates 19 and 22, directions of retardation axes 26a and 27a of the first and second retardation plates 26 and 27, and directions of optical axes 28a and 29a of the first and second optical films 28 and 29.

As shown in FIG. 19, the aligning treatment directions 7a and 8a of the first and second alignment films 7 and 8 of the liquid crystal cell 1, the directions of the absorption axes 12a and 16a of the polarizing layers 12 and 16 of the first and second polarizing plates 11 and 15, and the optical axis directions 20a and 23a of the viewing angle compensating layers 20 and 23 of the first and second viewing angle compensating plates 19 and 22 are the same as those in the first and second embodiments.

On the other hand, the first retardation plate 26 is arranged so that its retardation axis 26a is set to parallel with a direction crossing a lateral axis direction (a direction indicated by an alternate long and shot dash line in the drawing) of the screen counterclockwise as seen from an observation side at an angle of substantially 110°. The second retardation plate 27 is arranged so that its retardation axis 27a is set to parallel with a direction crossing the lateral axis direction of the screen clockwise as seen from the observation side at an angle of substantially 20°, i.e., a direction substantially perpendicular to the retardation axis 26a of the first retardation plate 26. It is to be noted that the directions of the optical axes 28a and 29a of the first and second optical films 28 and 29 are perpendicular to the substrate surfaces of the liquid crystal cell 1.

Furthermore, in this embodiment, a value of $\Delta nd$ of the liquid crystal layer 10 of the liquid crystal cell 1 is set to 385 nm, and values of a retardation Rthi in a thickness direction and an in-plane retardation Roi of each of the first and second viewing angle compensating layers 20 and 23 are set to Rthi=159 nm and Roi=−38 nm. Moreover, values of a retardation Rthi in the thickness direction and an in-plane retardation Roi of each of base films 14 and 18 on surfaces of the first and second polarizing layers 12 and 16 facing the liquid crystal cell 1 and each of base films 21 and 24 of the first and second viewing angle compensating layers 20 and 23 are set to Rthi=89 nm and Roi=9 nm. Additionally, values of a retardation Rthi in the thickness direction and an in-plane retardation Roi of each of the first and second retardation plates 26 and 27 are set to Rthi=50 nm and Roi=64 nm. Further, a retardation Rthi in the thickness direction of each of the first and second optical films 28 and 29 is set to −160 nm (an in-plane retardation Roi of this optical film 28 or 29 is set to zero). As explained above, a total value of the values of the retardations in the thickness direction of the plurality of optical layers between the first polarizing layer 12 and the second polarizing layer 16 excluding the liquid crystal layer 10 and the value of the retardation in the liquid crystal layer thickness direction of the liquid crystal layer 10 is set to the range of 0±80 nm.

Figure 20A:
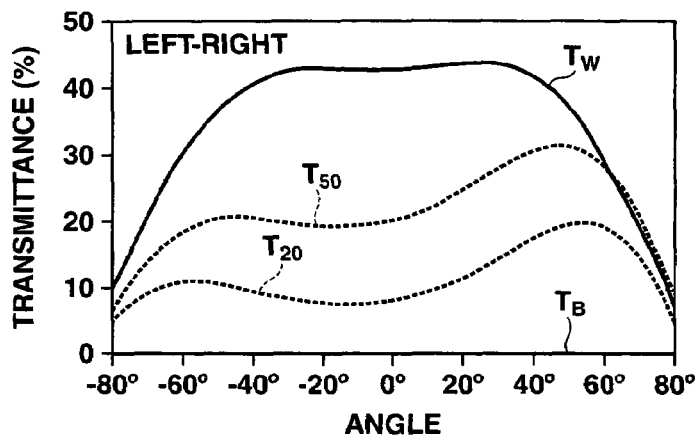
FIGS. 20A to 20D are viewing angle characteristic views at the time of white display $T_W$, black display $T_B$, 50% gradation (a gradation with 50% brightness of white display) display $T_{50}$, and 20% gradation (a gradation with 20% brightness of white display) display $T_{20}$ in the liquid crystal display device according to the third embodiment.
Figure 20B:
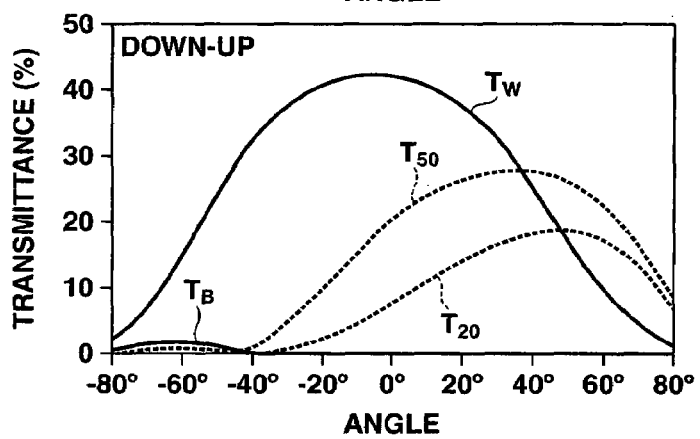
Figure 20C:
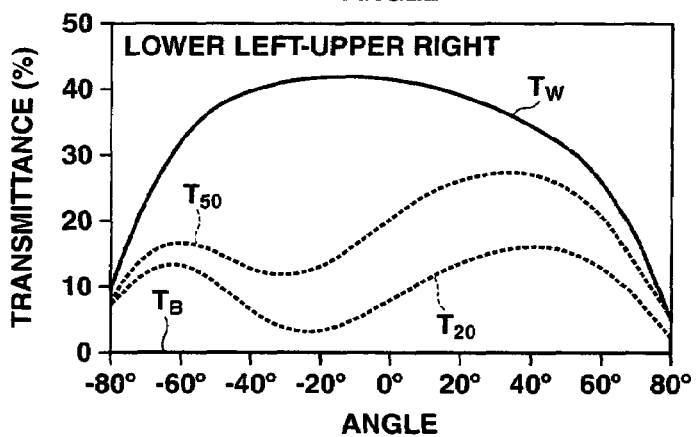
Figure 20D:
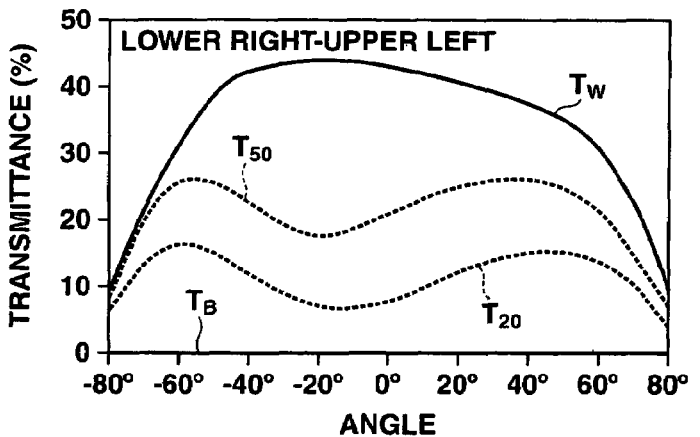

FIGS. 20A to 20D are viewing angle characteristic views at the time of white display $T_W$, black display $T_B$, 50% gradation display $T_{50}$, and 20% gradation display $T_{20}$ of the liquid crystal display device according to this embodiment. FIG. 20A shows viewing angle characteristics in a right-and-left direction of a screen, FIG. 20B shows viewing angle characteristics in an up-and-down direction of the screen, FIG. 20C shows viewing angle characteristics in a direction from the lower left to the lower right of the screen, and FIG. 20D shows viewing angle characteristics in a direction from the lower right to the upper left of the screen.

As shown in FIGS. 20A to 20D, the liquid crystal display device according to this embodiment has viewing angle characteristics that angle dependency of a transmittance in each direction, i.e., the right-and-left direction, the up-and-down direction, the direction from the lower left to the lower right, and the direction from the lower right to the upper left in the screen is improved and inversion of the intermediate gradation does not occur in a wide angle range in each of the these directions. The television receiver using this liquid crystal display device has wide viewing angles in a right-and-left direction, a direction from the lower left to the lower right, and a direction from the lower right to the upper left and also has high contrast in particular.

Fourth Embodiment

Figure 21:
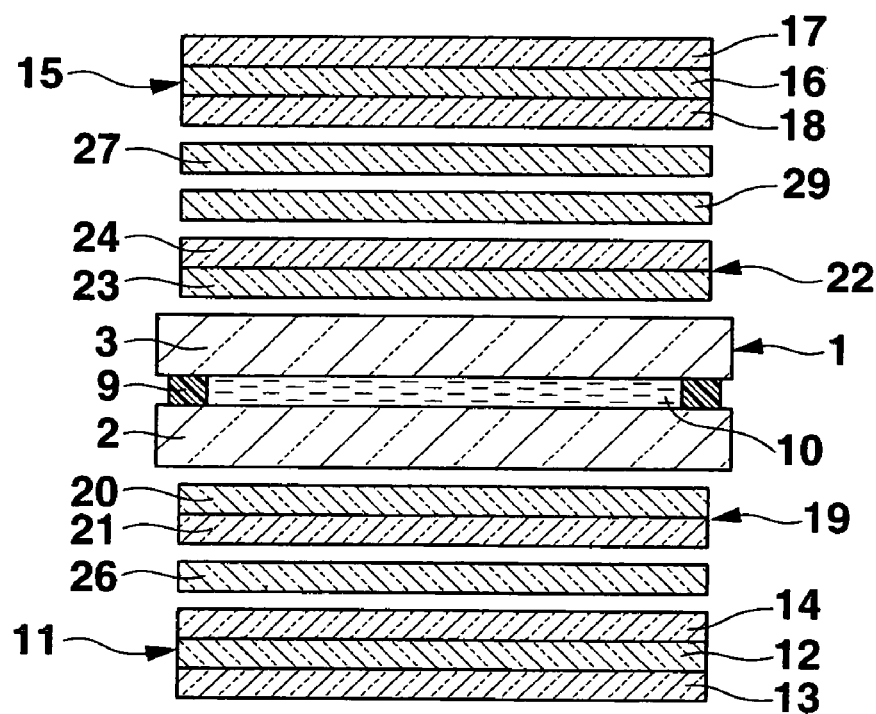
FIG. 21 is a schematic cross-sectional view of a liquid crystal display device used in a fourth embodiment of the present invention.
Figure 22:
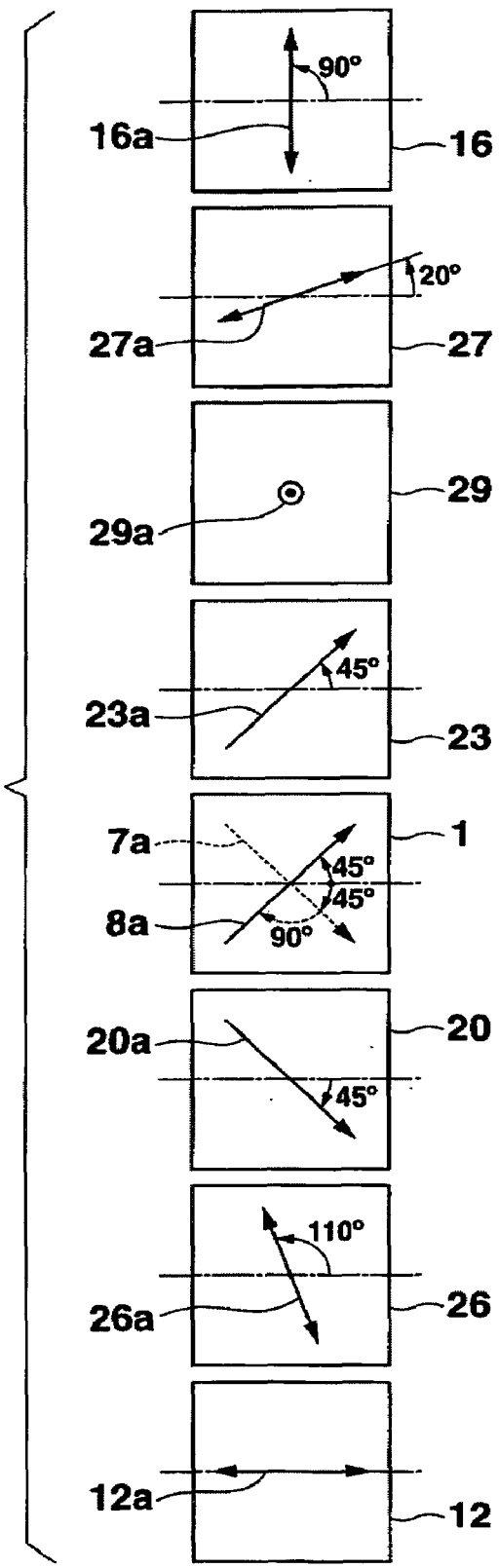
FIG. 22 is a view showing aligning treatment directions of first and second alignment films, directions of absorption axes of first and second polarizing layers, directions of optical axes of first and second viewing angle compensating layers, directions of retardation axes of first and second retardation plates, and directions of optical axes of optical films in the liquid crystal display device according to the fourth embodiment.

FIGS. 21 to 23 show a fourth embodiment according to the present invention, and FIG. 21 is a schematic cross-sectional view of a liquid crystal display device used in the fourth embodiment.

The liquid crystal display device according to this embodiment has a structure where the optical film 29 provided in the third embodiment is further arranged either between the first retardation plate 26 and the first viewing angle compensating plate 19 or between the second retardation plate 27 and the second viewing angle compensating plate 22, e.g., between the first retardation plate 26 and the first viewing angle compensating plate 19 in the liquid crystal display device according to the second embodiment. A plurality of optical layers between a first polarizing layer 12 and a second polarizing layer 16 excluding a liquid crystal layer 10 include base films 14 and 18 on surfaces of the first and second polarizing layers 12 and 16 facing a pair of substrates 2 and 3 of a liquid crystal cell 1, the first and second viewing angle compensating layers 20 and 23 and their base films 21 and 24, the first and second retardation plates 26 and 27, and the optical film 29. It is to be noted that other structures of the liquid crystal display device according to this embodiment are substantially the same as those according to the third embodiment.

FIG. 22 show aligning treatment directions 7a and 8a of first and second alignment films 7 and 8 of the liquid crystal cell 1, directions of absorption axes 12a and 16a of the polarizing layers 12 and 16 of the first and second polarizing plates 11 and 15, optical axis directions 20a and 23a of the viewing angle compensating layers 20 and 23 of the first and second viewing angle compensating plates 19 and 22, directions of retardation axes 26a and 27a of the first and second retardation plates 26 and 27, and a direction of an optical axis 29a of the optical film 29.

As shown in FIG. 22, the aligning treatment directions 7a and 8a of the first and second alignment films 7 and 8 of the liquid crystal cell 1, the directions of the absorption axes 12a and 16a of the polarizing layers 12 and 16 of the first and second polarizing plates 11 and 15, and the optical axis directions 20a and 23a of the viewing angle compensating layers 20 and 23 of the first and second viewing angle compensating plates 19 and 22 are the same as those in the second embodiment. Further, the direction of the retardation axis 26a of the first retardation plate 26, the direction of the retardation axis 27a of the second retardation plate 27 are the same as those in the third embodiment. It is to be noted that the direction of the optical axis 29a of the optical film 29 is perpendicular to substrate surfaces of the liquid crystal cell 1.

Furthermore, in this embodiment, a value of Δnd of the liquid crystal layer 10 in the liquid crystal cell 1 is set to 386 nm, and values of a retardation Rthi in a thickness direction and an in-plane retardation Roi of each of the first and second viewing angle compensating layers 20 and 23 are set to Rthi=159 nm and Roi=−38 nm. Moreover, values of a retardation Rthi in the thickness direction and an in-plane retardation Roi of each of the base films 14 and 18 on the surfaces of the first and second compensating layers 12 and 16 facing the liquid crystal cell 1 and each of the base films 21 and 24 of the first and second viewing angle compensating layers 20 and 23 are set to Rthi=89 nm and Roi=9 nm. Additionally, values of a retardation Rthi in the thickness direction and an in-plane retardation Roi of each of the first and second retardation plates 26 and 27 are set to Rthi=50 nm and Roi=64 nm. Further, a retardation Rthi in the thickness direction of the optical film 28 is set to −160 nm (an in-plane retardation Roi of this optical film 28 is 0). In this manner, a total value of the value of the retardations in the thickness value of the plurality of optical layers between the first polarizing layer 12 and the second polarizing layer 16 excluding the liquid crystal layer 10 and a value of a retardation in the liquid crystal layer thickness direction of the liquid crystal layer 10 is set to fall within the range of 0±80 nm.

Figure 23A:
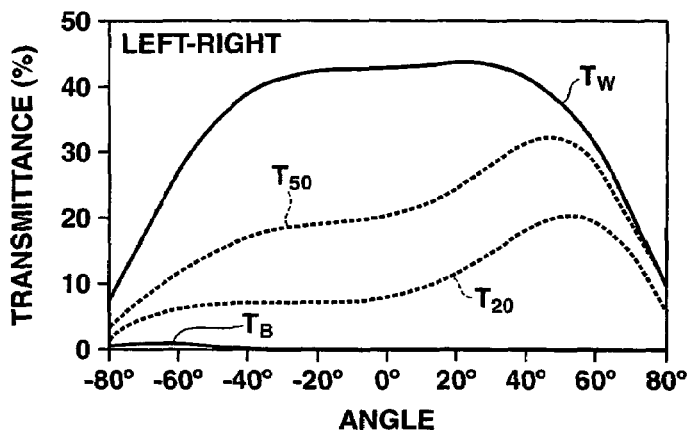
FIGS. 23A to 23D are viewing angle characteristic views at the time of white display $T_W$, black display $T_B$, 50% gradation (a gradation with 50% brightness of white display) display $T_{50}$, and 20% gradation (a gradation with 20% brightness of white display) display $T_{20}$ in the liquid crystal display device according to the fourth embodiment.
Figure 23B:
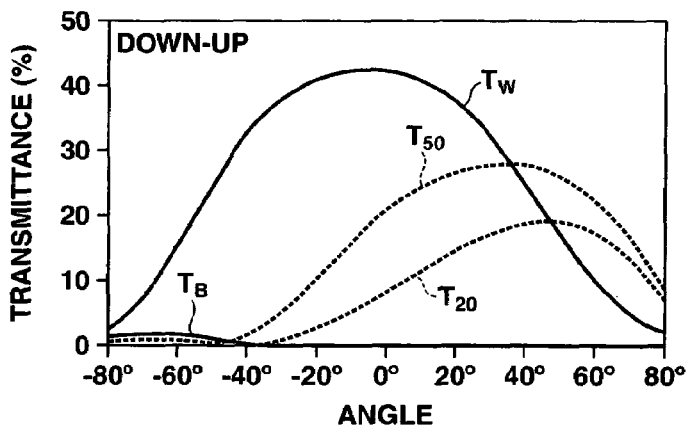
Figure 23C:
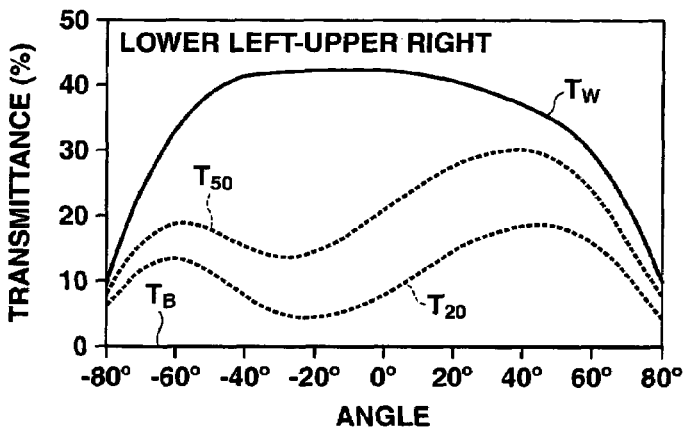
Figure 23D:
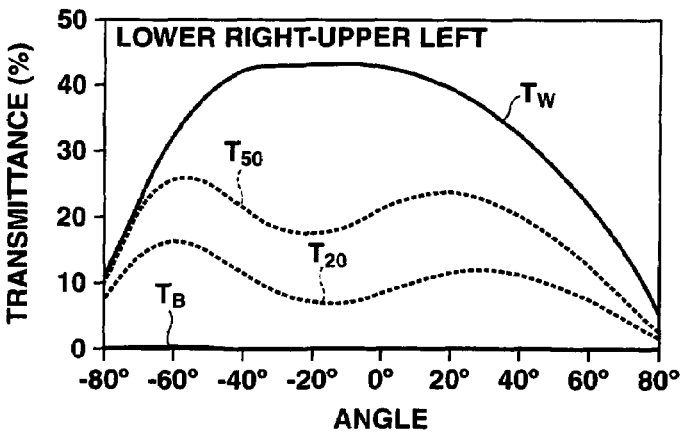

FIGS. 23A to 23D are viewing angle characteristic views at the time of white display $T_W$, black display $T_B$, 50% gradation display $T_{50}$, and 20% gradation display $T_{20}$ of the liquid crystal display device according to this embodiment. FIG. 23A shows viewing angle characteristics in a right-and-left direction of a screen, FIG. 23B shows viewing angle characteristics in an up-and-down direction of the screen, FIG. 23C shows viewing angle characteristics in a direction from the lower left to the lower right, and FIG. 23D shows viewing angle characteristics in a direction from the lower right to the upper left.

As shown in FIGS. 23A to 23D, the liquid crystal display device according to this embodiment has viewing angle characteristics that angle dependency of a transmittance in each direction, i.e., the right-and-left direction, the up-and-down direction, the direction from the lower left to the lower right, and the direction from the lower right to the upper left is improved and inversion of an intermediate gradation does not occur in a wide angle range in each of the these direction. The television receiver using this liquid crystal display device has wide viewing angles in a right-and-left direction, a direction from the lower left to the lower right, and a direction from the lower right to the upper left and also has high contrast in particular.

Fifth Embodiment

Figure 24:
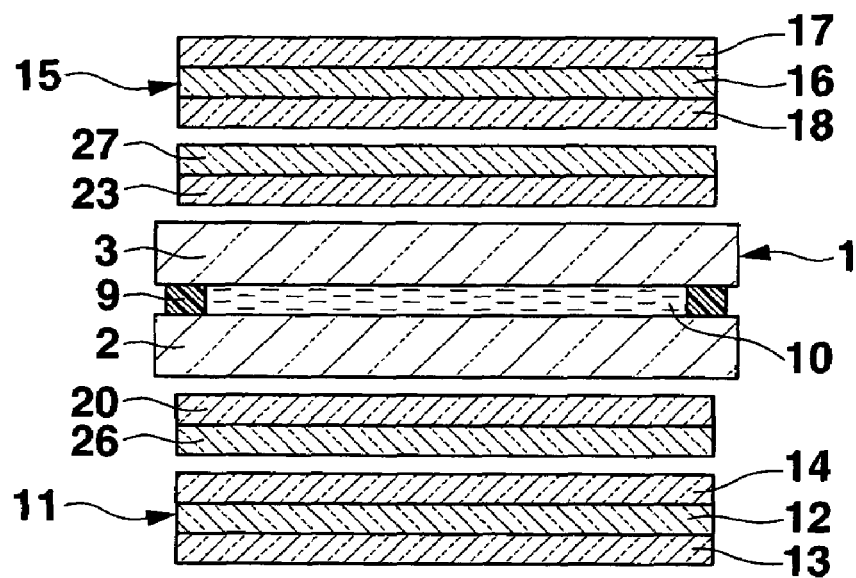
FIG. 24 is a schematic cross-sectional view of a liquid crystal display device used in a fifth embodiment of the present invention.
Figure 25:
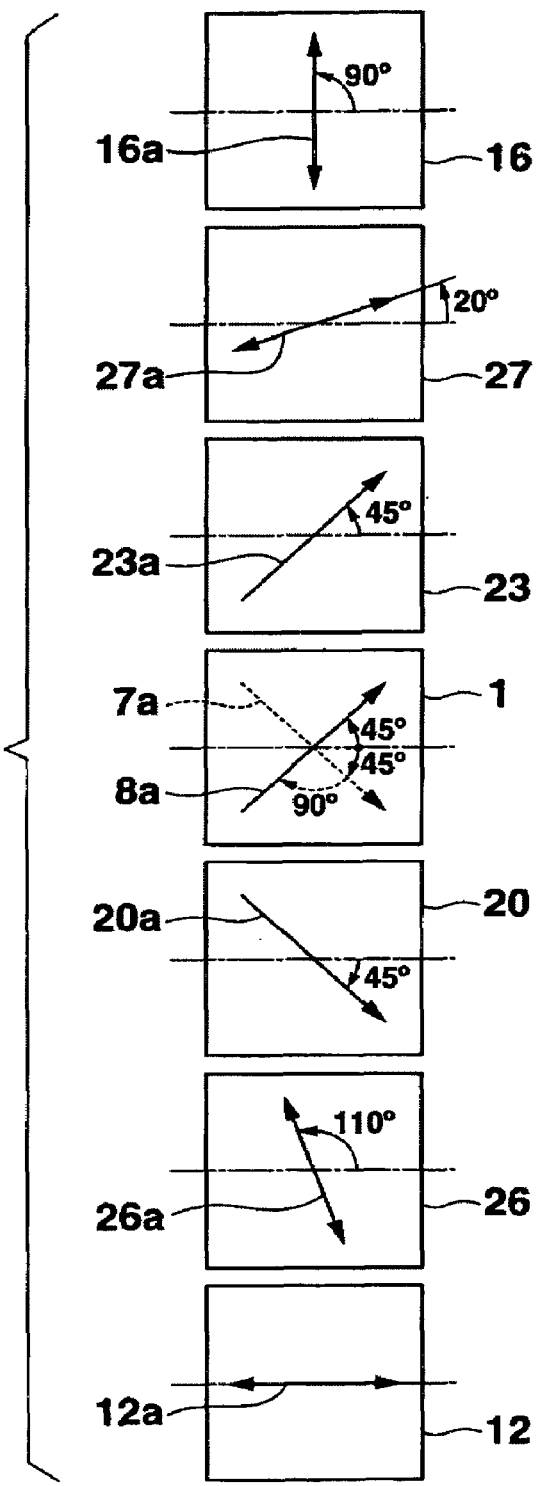
FIG. 25 is a view showing aligning treatment directions of first and second alignment films, directions of absorption axes of first and second polarizing layers, directions of optical axes of first and second viewing angle compensating layers, and directions of retardation axes of first and second retardation plates in the liquid crystal display device according to the fifth embodiment.

FIGS. 24 to 26 show a fifth embodiment according to the present invention, and FIG. 24 is a schematic cross-sectional view of a liquid crystal display device used in the fifth embodiment.

The liquid crystal display device according to this embodiment has a structure where first and second viewing angle compensating layers 20 and 23 are formed on plate surfaces of first and second retardation plates 26 and 27 in the liquid crystal display device according to the second embodiment. A plurality of optical layers between a first polarizing layer 12 and a second polarizing layer 16 excluding a liquid crystal layer 10 include base films 14 and 16 on surfaces of the first and second polarizing layers 12 and 16 facing a pair of substrates 2 and 3 of a liquid crystal cell 1, the first and second viewing angle compensating layers 20 and 23, and the first and second retardation plates 26 and 27. It is to be noted that other structures of the liquid crystal display device according to this embodiment are substantially the same as those in the second embodiment.

FIG. 25 shows aligning treatment directions 7a and 8a of first and second alignment films 7 and 8 of the liquid crystal cell 1, directions of absorption axes 12a and 16a of the polarizing layers 12 and 16 of first and second polarizing plates 11 and 15, optical axis directions 20a and 23a of the first and second viewing angle compensating layers 20 and 23, and directions of retardation axes 26a and 27a of the first and second retardation plates 26 and 27 in the liquid crystal display device according to the present invention.

As shown in FIG. 25, the aligning treatment directions 7a and 8a of the first and second alignment films 7 and 8 of the liquid crystal cell 1, the directions of the absorption axes 12a and 16a of the polarizing layers 12 and 16 of the first and second polarizing plates 11 and 15, and the optical axis directions 20a and 23a of the first and second viewing angle compensating layers 20 and 23 are the same as those in the first embodiment. Furthermore, the direction of the retardation axis 26a of the first retardation plate 26 and the direction of the retardation axis 27a of the second retardation plate 27 are the same as those in the third embodiment.

Moreover, in this embodiment, a value of Δnd of the liquid crystal layer 10 in the liquid crystal cell 1 is set to 385 nm, and values of a retardation Rthi in a thickness direction and an in-plane retardation Roi of each of the first and second viewing angle compensating layers 20 and 23 are set to Rthi=70 nm and Roi=−47 nm. Additionally, values of a retardation Rthi in the thickness direction and an in-plane retardation Roi of each of the base films 14 and 18 on the surfaces of the first and second polarizing layers 12 and 16 facing the liquid crystal cell 1 are set to Rthi=89 nm and Roi=9 nm. Further, values of a retardation Rthi in the thickness direction and an in-plane retardation Roi of each of the first and second retardation plates 26 and 27 are set to Rthi=55 nm and Roi=71 nm. In this manner, a total value of the retardation values in the thickness direction of the plurality of optical layers between the first polarizing layer 12 and the second polarizing layer 16 excluding the liquid crystal layer 10 and a retardation value in a liquid crystal layer thickness direction of the liquid crystal layer 10 is set to fall within the range of 0±80 nm.

In the liquid crystal display device according to this embodiment, since the first and second viewing angle compensating layers 20 and 23 are formed on the plate surfaces of the first and second retardation plates 26 and 27, the base films 14 and 18 alone on the surfaces of the first and second polarizing layers 12 and 16 facing the liquid crystal cell 1 are determined as the base films having the retardations in the thickness direction among the plurality of optical layers between the first polarizing layer 12 and the second polarizing layer 16. Since the number of the base films having the retardations in the thickness direction is reduced in this manner, the angle dependency of a transmittance is further efficiently improved.

Figure 26A:
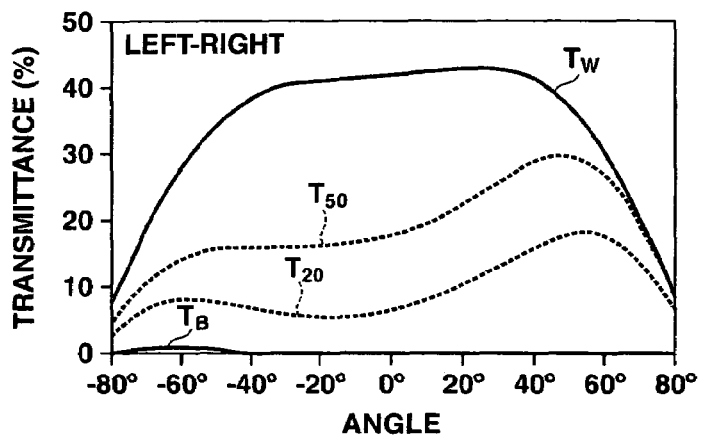
FIGS. 26A to 26D are viewing angle characteristic views at the time of white display $T_W$, black display $T_B$, 50% gradation (a gradation with 50% brightness of white display) display $T_{50}$, and 20% gradation (a gradation with 20% brightness of white display) display $T_{20}$ in the liquid crystal display device according to the fifth embodiment.
Figure 26B:
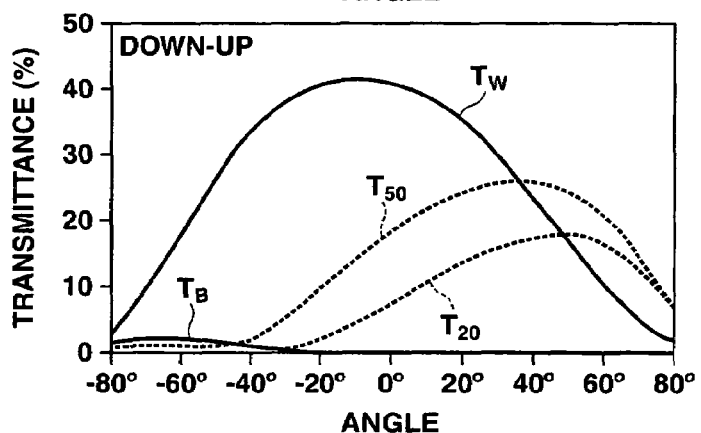
Figure 26C:
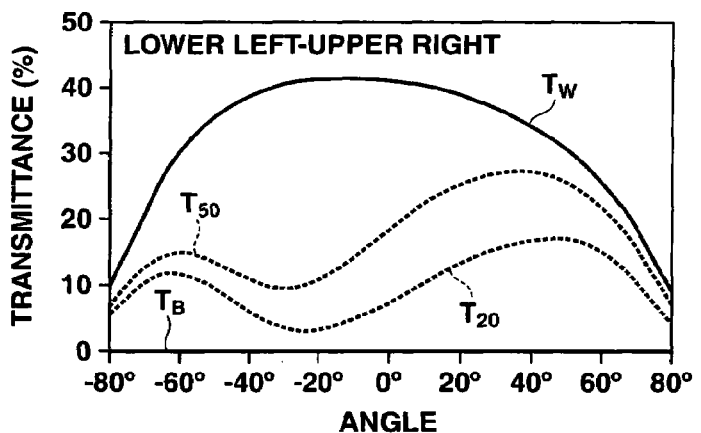
Figure 26D:
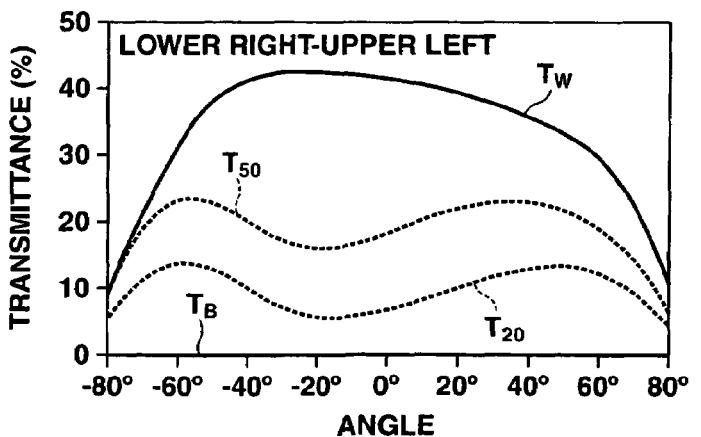

FIGS. 26A to 26D are viewing angle characteristic views at the time of white display $T_W$, black display $T_B$, 50% gradation display $T_{50}$, and 20% gradation display $T_{20}$ of the liquid crystal display device according to this embodiment. FIG. 26A shows viewing angle characteristics in a right-and-left direction of a screen, FIG. 26B shows viewing angle characteristics in an up-and-down direction of the screen, FIG. 26C shows viewing angle characteristics in a direction from the lower left to the lower right of the screen, and FIG. 26D shows viewing angle characteristics of a direction from the lower right to the upper left of the screen.

As shown in FIGS. 26A to 26D, the liquid crystal display device according to this embodiment has viewing angle characteristics that angle dependency of a transmittance in each direction, i.e., the right-and-left direction, the up-and-down direction, the direction from the lower left to the lower right, and the direction from the lower right to the upper left and inversion of an intermediate gradation does not occur in a wide angle range in each of these directions. The television receiver using this liquid crystal display device has wide viewing angles in a right-and-left direction, a direction from the lower left to the lower right, and a direction from the lower right to the upper left and also has high contrast in particular.

Sixth Embodiment

Figure 27:
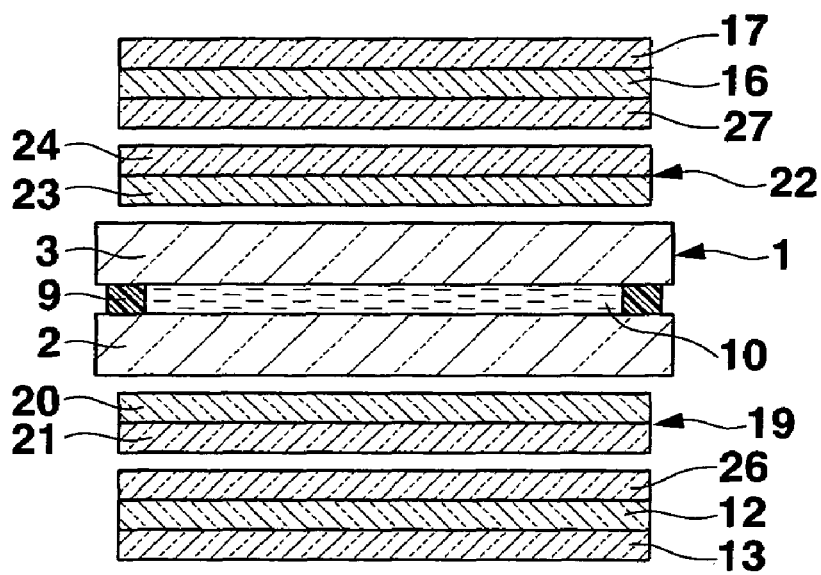
FIG. 27 is a schematic cross-sectional view of a liquid crystal display device used in a sixth embodiment according to the present invention.
Figure 28:
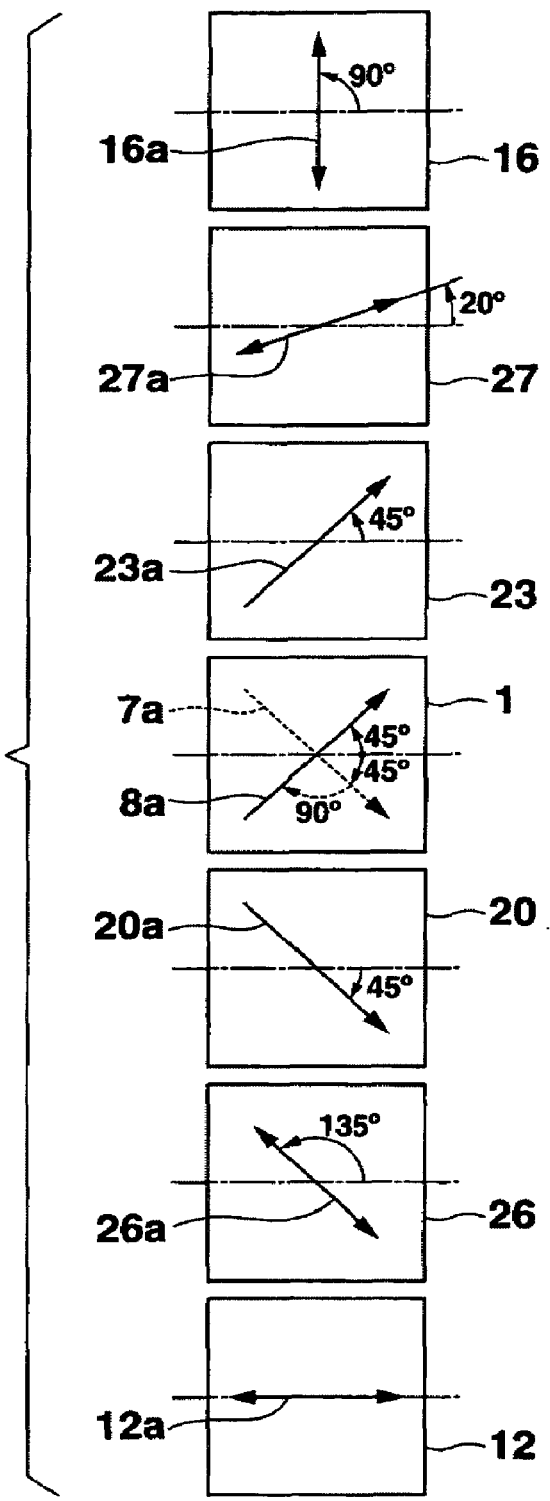
FIG. 28 is a view showing aligning treatment directions of first and second alignment films, directions of absorption axes of first and second polarizing layers, directions of optical axes of first and second viewing angle compensating layers, and directions of retardation axes of first and second retardation plates in the liquid crystal display device according to the sixth embodiment.

FIGS. 27 to 29 show a sixth embodiment according to the present invention, and FIG. 27 is a schematic cross-sectional view of a liquid crystal display device used in the sixth embodiment.

The liquid crystal display device according to this embodiment has a structure where base films 13 and 17 are provided on outer surfaces alone of first and second polarizing layers 12 and 16 opposite to surfaces of the same facing a pair of substrates 2 and 3 of a liquid crystal cell 1 and first and second retardation plates 26 and 27 are respectively laminated on the surfaces of the first and second polarizing layers 12 and 16 facing the liquid crystal cell 1. A plurality of optical layers between the first polarizing layer 12 and the second polarizing layer 16 excluding a liquid crystal layer 10 include the first and second retardation plates 26 and 27, the first and second viewing angle compensating layers 20 and 23, and base films 21 and 24 of these viewing angle compensating layers 20 and 23. It is to be noted that other structures of the liquid crystal display device according to this embodiment are substantially the same as those in the second embodiment.

FIG. 28 shows aligning treatment directions 7a and 8a of first and second alignment films 7 and 8 of the liquid crystal cell 1, directions of absorption axes 12a and 16a of the first and second polarizing layers 12 and 16, optical axis directions 20a and 23a of the first and second viewing angle compensating layers 20 and 23, and directions of retardation axes 26a and 27a of the first and second retardation plates 26 and 27 in the liquid crystal display device according to this embodiment.

As shown in FIG. 28, the aligning treatment directions 7a and 8a of the first and second alignment films 7 and 8 of the liquid crystal cell 1, the directions of the absorption axes 12a and 16a of the first and second polarizing layers 12 and 16, the optical axis directions 20a and 23a of the first and second viewing angle compensating layers 20 and 23, and the directions of the retardation axes 26a and 27a of the first and second retardation plates 26 and 27 are the same as those in the first embodiment.

Further, in this embodiment, a value of Δnd of a liquid crystal layer 10 of the liquid crystal cell 1 is set to 420 nm, values of a retardation Rthi in a thickness direction and an in-plane retardation Roi of each of the first and second viewing angle compensating layers 20 and 23 are set to Rthi=159 nm and Roi=−38 nm. Furthermore, values of a retardation Rthi in the thickness direction and an in-plane retardation Roi of each of the base films 21 and 24 of the first and second viewing angle compensating layers 20 and 23 are set to Rthi=89 nm and Roi=9 nm. Moreover, values of a retardation Rthi in the thickness direction and an in-plane retardation Roi of the first and second retardation plates 26 and 27 are set to Rthi=175 nm and Roi=35 nm. A total value of the retardation values in the thickness direction of the plurality of optical layers between the first polarizing layer 12 and the second polarizing layer 16 excluding the liquid crystal layer 10 and a retardation value in a liquid crystal layer thickness direction of the liquid crystal layer 10 is set to fall within the range of 0±80 nm in this manner.

In the liquid crystal display device according to this embodiment, the base films 13 and 17 are provided on the outer surfaces alone of the first and second polarizing layers 12 and 16, and the first and second retardation plates 26 and 27 are laminated on the surfaces of the first and second polarizing layers 12 and 16 facing the liquid crystal cell 1. Thus, the base films 21 and 24 of the first and second viewing angle compensating layers 20 and 23 alone are determined as the base films having the retardations in the thickness direction among the plurality of optical layers between the first polarizing layer 12 and the second polarizing layer 16. Since the number of base films having the retardations in the thickness direction is reduced in this manner, the angle dependency of a transmittance is further effectively improved.

Figure 29A:
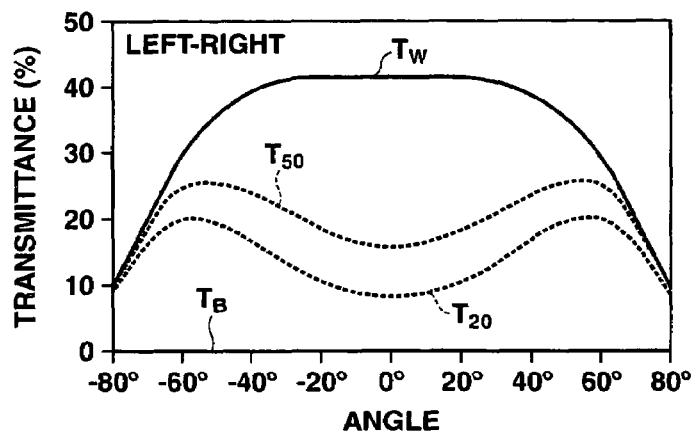
FIGS. 29A to 29D are viewing angle characteristic views at the time of white display $T_W$, black display $T_B$, 50% gradation (a gradation with 50% brightness of white display) display $T_{50}$, and 20% gradation (a gradation with 20% brightness of white display) display $T_{20}$ in the liquid crystal display device according to the sixth embodiment.
Figure 29B:
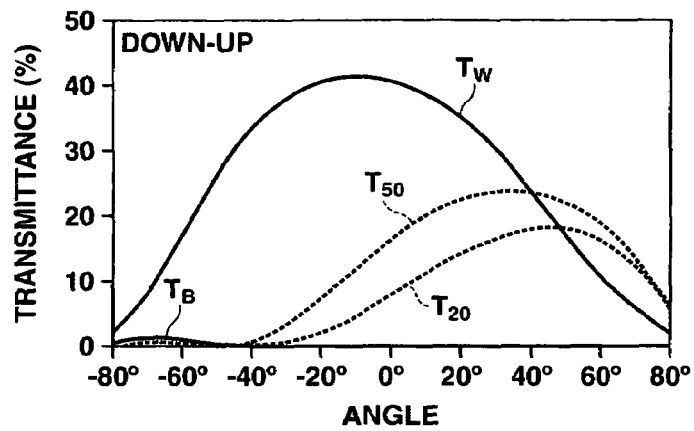
Figure 29C:
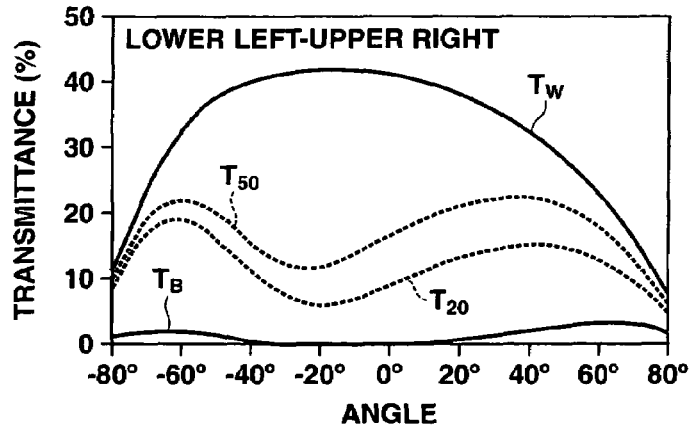
Figure 29D:
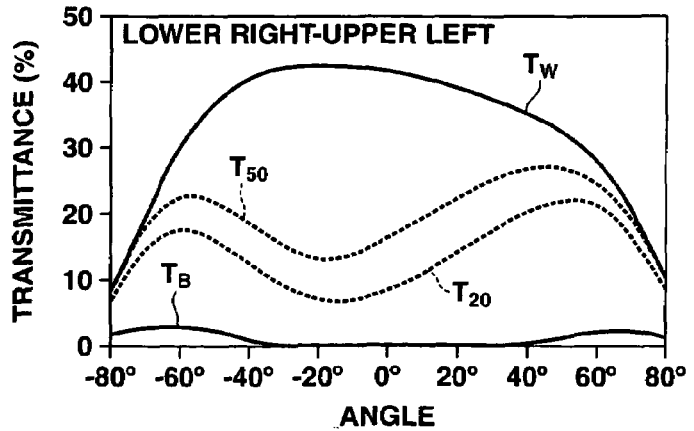

FIGS. 29A to 29D are viewing angle characteristic views at the time of white display $T_W$, black display $T_B$, 50% gradation display $T_{50}$, and 20% gradation display $T_{20}$ of a liquid crystal display device according to this embodiment. FIG. 29A shows viewing angle characteristics in a right-and-left direction of a screen, FIG. 29B shows viewing angle characteristics in an up-and-down direction of the screen, FIG. 29C shows viewing angle characteristics of a direction from the lower left to the lower right of the screen, and FIG. 29D shows viewing angle characteristics in a direction from the lower right to the upper left of the screen.

As shown in FIGS. 29A to 29D, the liquid crystal display device according to this embodiment has viewing angle characteristics that the angle dependency of a transmittance in each direction, i.e., the right-and-left direction, the up-and-down direction, the direction from the lower left to the lower right, and the direction from the lower right to the upper left of the screen is improved and inversion of an intermediate gradation does not occur in a wide angle range in each of these directions. The television receiver using this liquid crystal display device has wide viewing angles in a right-and-left direction, a direction from the lower left to the lower right, and a direction from the lower right to the upper left and also has high contrast in particular.

Seventh Embodiment

Figure 30:
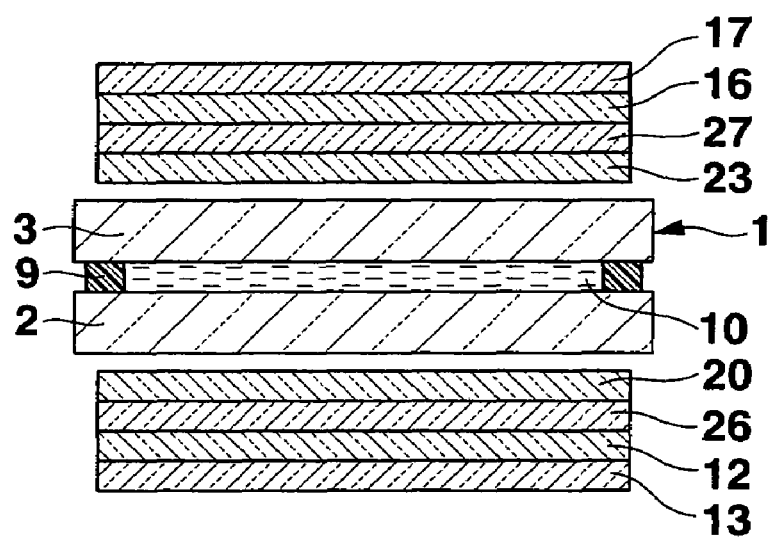
FIG. 30 is a schematic cross-sectional view of a liquid crystal display device used in a seventh embodiment according to the present invention.
Figure 31:
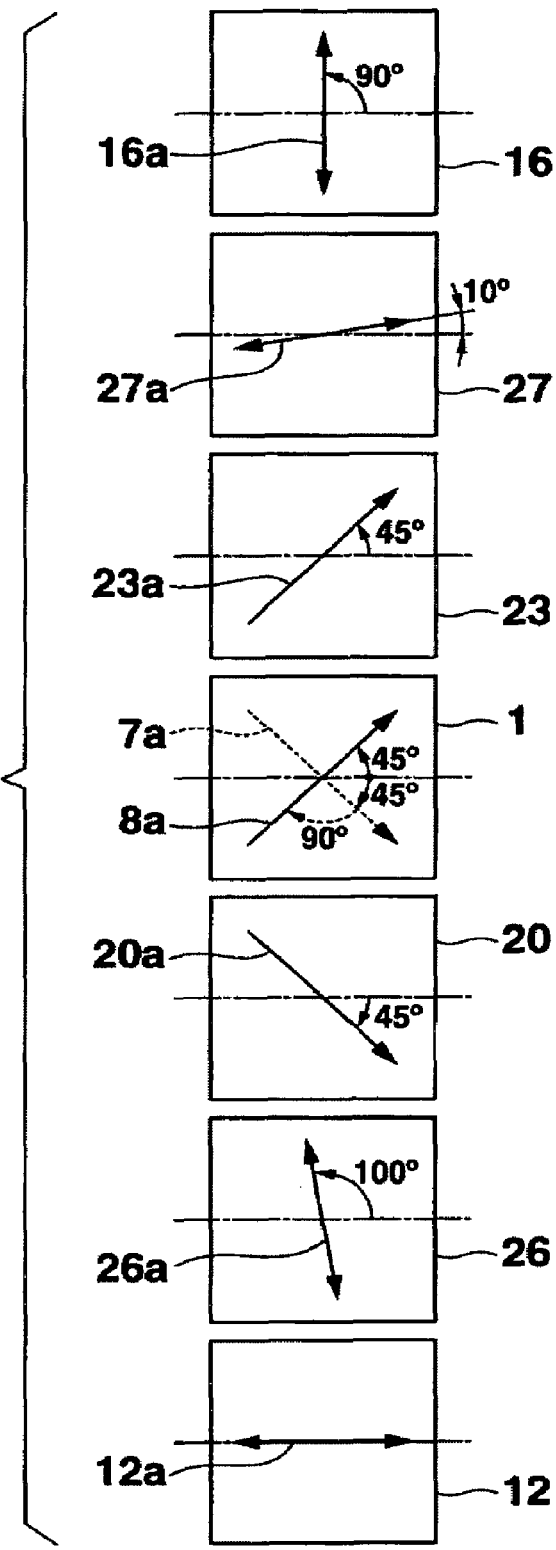
FIG. 31 is a view showing aligning treatment directions of first and second alignment films, directions of absorption axes of first and second polarizing layers, directions of optical axes of first and second viewing angle compensating layers, and directions of retardation axes of first and second retardation plates in the liquid crystal display device according to the seventh embodiment.

FIGS. 30 to 32 show a seventh embodiment according to the present invention, and FIG. 30 is a schematic cross-sectional view of a liquid crystal display device used in the seventh embodiment.

The liquid crystal display device according to this embodiment has a structure where base films 13 and 17 are provided on outer surfaces alone of first and second polarizing layers 12 and 16 opposite to surfaces of the same facing a pair of substrates 2 and 3 of a liquid crystal cell 1, first and second retardation plates 26 and 27 are laminated on the surfaces of the first and second polarizing layers 12 and 16 facing the liquid crystal cell 1, and first and second viewing angle compensating layers 20 and 23 are formed on surfaces of the first and second retardation plates 26 and 27 facing the liquid crystal cell 1 in the liquid crystal display device according to the second embodiment. A plurality of optical layers between the first polarizing layer 12 and the second polarizing layer 16 excluding a liquid crystal layer 10 include the first and second retardation plates 26 and 27 and the first and second viewing angle compensating layers 20 and 23. It is to be noted that other structures of the liquid crystal display device according to this embodiment are substantially the same as those in the second embodiment.

FIG. 31 shows aligning treatment directions 7a and 8a of first and second alignment films 7 and 8 of the liquid crystal cell 1, directions of absorption axes 12a and 16a of the first and second polarizing layers 12 and 16, optical axis directions 20a and 23a of the first and second viewing angle compensating layers 20 and 23, and directions of retardation axes 26a and 27a of the first and second retardation plates 26 and 27 in the liquid crystal display device according to this embodiment.

As shown in FIG. 31, the aligning treatment directions 7a and 8a of the first and second alignment films 7 and 8 of the liquid crystal cell 1, the directions of the absorption axes 12a and 16a of the first and second polarizing layers 12 and 16, and the optical axis directions 20a and 23a of the first and second viewing angle compensating layers 20 and 23 are the same as those in the first embodiment. The first retardation plate 26 is arranged so that its retardation axis 26a is set to parallel with a direction crossing a lateral axis direction of the screen counterclockwise as seen from an observation side at an angle of substantially 100°. The second retardation plate 27 is arranged so that its retardation axis 27a is set to parallel with a direction crossing the lateral axis direction of the screen counterclockwise as seen from the observation side at an angle of substantially 10°, i.e., a direction substantially perpendicular to the retardation axis 26a of the first retardation plate 26.

Further, in this embodiment, a value of Δnd of the liquid crystal layer 10 of the liquid crystal cell 1 is set to 430 nm, and values of a retardation Rthi in a thickness direction and an in-plane retardation Roi of each of the first and second viewing angle compensating layers 20 and 23 are set to Rthi=70 nm and Roi=−47 nm. Furthermore, values of a retardation Rthi in the thickness direction and an in-plane retardation Roi of each of the first and second retardation plates 26 and 27 are set to Rthi=70 nm and Roi=48 nm. In this manner, a total value of the retardation values in the thickness direction of the plurality of optical layers between the first polarizing layer 12 and the second polarizing layer 16 excluding the liquid crystal layer 10 and a retardation value in a liquid crystal layer thickness direction of the liquid crystal layer 10 is set to fall within the range of 0±80 nm.

In the liquid crystal display device according to this embodiment, the base films 13 and 17 are provided on the outer surfaces alone of the first and second polarizing layers 12 and 16 opposite to the surfaces facing the pair of substrates 2 and 3 of the liquid crystal cell 1, the first and second retardation plates 26 and 27 are laminated on the surfaces of the first and second polarizing layers 12 and 16 facing the liquid crystal cell 1, and the first and second viewing angle compensating layers 20 and 23 are formed on the surfaces of the first and second retardation plates 26 and 27 facing the liquid crystal cell 1. Thus, base films having retardations in the thickness direction are eliminated from the plurality of optical layers between the first polarizing layer 12 and the second polarizing layer 16, and the base films 21 and 24 alone of the first and second viewing angle compensating layers 20 and 23 are adopted. As explained above, since the number of the base films having the retardations in the thickness direction is reduced, the angle dependency of a transmittance is further effectively improved.

Figure 32A:
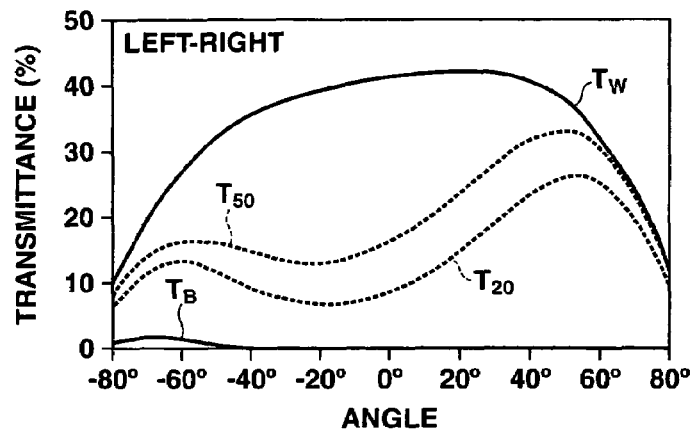
FIGS. 32A to 32D are viewing angle characteristic views at the time of white display $T_W$, black display $T_B$, 50% gradation (a gradation with 50% brightness of white display) display $T_{50}$, and 20% gradation (a gradation with 20% brightness of white display) display $T_{20}$ in the liquid crystal display device according to the seventh embodiment.
Figure 32B:
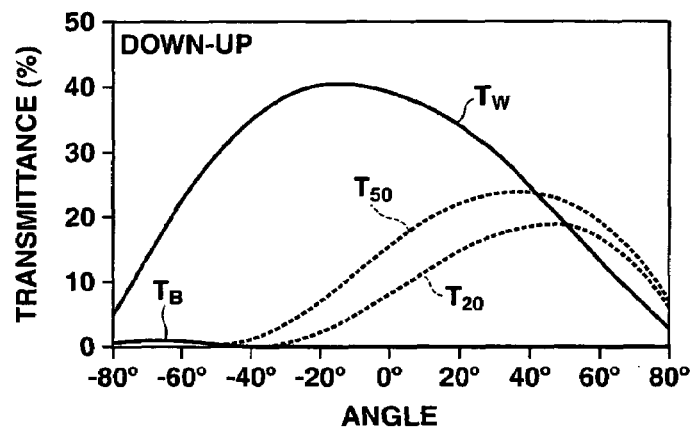
Figure 32C:
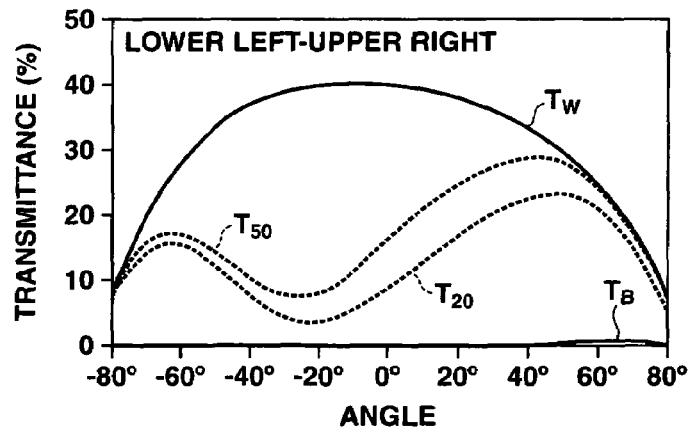
Figure 32D:
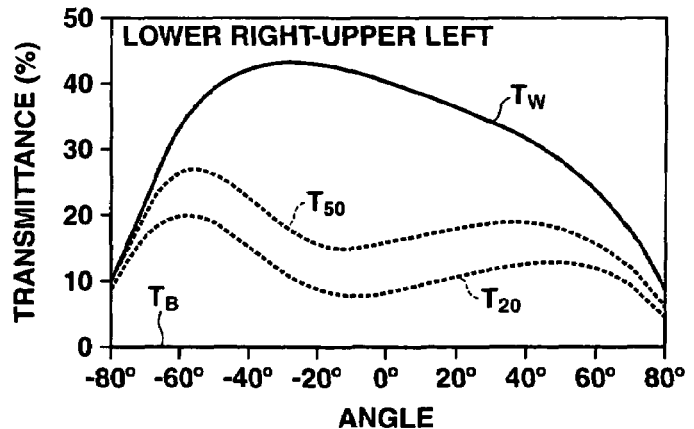

FIGS. 32A to 32D are viewing angle characteristic views at the time of white display $T_W$, black display $T_B$, 50% gradation display $T_{50}$, and 20% gradation display $T_{20}$ of the liquid crystal display device according to this embodiment. FIG. 32A shows viewing angle characteristics in a right-and-left direction of a screen, FIG. 32B shows viewing angle characteristics in an up-and-down direction of the screen, FIG. 32C shows viewing angle characteristics in a direction from the lower left to the lower right of the screen, and FIG. 32D shows viewing angle characteristics in a direction from the lower right to the upper left of the screen.

As shown in FIGS. 32A to 32D, the liquid crystal display device according to this embodiment has viewing angle characteristics that the angle dependency of a transmittance in each direction, i.e., the right-and-left direction, the up-and-down direction, the direction from the lower left to the lower right, and the direction from the lower right to the upper left of the screen is improved and inversion of the intermediate gradation does not occur in a wide angle range in each of these directions. The television receiver using this liquid crystal display device has wide viewing angles in a right-and-left direction, a direction from the lower left to the lower right, and a direction from the lower right to the upper left and also has high contrast in particular.

Other Embodiments

Although each of the first and second viewing angle compensating layers 20 and 23 according to each of the foregoing embodiments is formed of discotic liquid crystal layer in when discotic liquid crystal molecules 25 are hybrid-aligned, the first and second viewing angle compensating layers are not restricted to the discotic liquid crystal layer, and it may be formed of a liquid crystal layer in which, e.g., elongated spherical liquid crystal molecules are inclined and aligned in one direction with respect to a plane parallel to the substrate surfaces of the liquid crystal cell 1.

Furthermore, although the liquid crystal display device according to each of the foregoing embodiments is of a normally white type in which the first polarizing layer 12 and the second polarizing layer 16 are arranged so that their absorption axes 12a and 16a are substantially perpendicular to each other, the liquid crystal display device may be of a normally black type in which the first polarizing layer 12 and the second polarizing layer 16 are arranged so that their absorption axes 12a and 16a are substantially parallel to each other.

Moreover, although the television receiver according to each of the foregoing embodiments is a digital broadcasting receiving apparatus that receives digital broadcast waves, demodulates the digital broadcast waves to output a transport stream, separates a picture signal and an audio signal from this transport stream, and decodes these separated signals to generate picture data and audio data, the present invention is not restricted thereto. The receiving apparatus according to the present invention may be an analog broadcast wave receiving apparatus that receives and demodulates analog broadcast waves, and separates a picture signal and an audio signal from an analog signal having various kinds of signals superimposed thereon to generate the picture signal and the audio signal in accordance with an NTSC scheme. In this case, the television receiver using the liquid crystal display device has wide viewing angles.

As explained above, the liquid crystal display apparatus according to the present invention includes a liquid crystal display device. The liquid crystal display device includes: a liquid crystal cell including a pair of substrates in which at least one electrode and an alignment film covering the electrode are provided on each of inner surfaces of the substrates facing each other, and a liquid crystal layer that is sandwiched between the substrates and includes liquid crystal molecules twist-aligned; first and second polarizing plates that are arranged on both sides of the liquid crystal cell, each of the polarizing plates including a polarizing layer having a transmission axis allowing transmission of linear polarized light and an absorption axis in a direction perpendicular to the transmission axis, and at least one base film to support the polarizing layer; and first and second viewing angle compensating layers that are respectively arranged between the liquid crystal cell and the first and second polarizing plates, each of the viewing angle compensating layers having a phase difference within a plane parallel to substrate surfaces of the liquid crystal cell and a phase difference within a plane perpendicular to the substrate surfaces. A total value of retardations in a thickness direction, each of which is a product of a phase difference within a plane perpendicular to the substrate surfaces and a layer thickness, of a plurality of optical layers between the first and second polarizing layers, including at least the first and second viewing angle compensating layers but excluding the liquid crystal layer, is set to a value that cancels out a retardation in a liquid crystal layer thickness direction, which is a product of a phase difference within a plane perpendicular to the substrate surfaces and a liquid crystal layer thickness, of the liquid crystal layer when a voltage sufficiently high to raise and align the liquid crystal molecules with respect to the substrate surfaces is applied to the liquid crystal layer between the electrodes of the first and second substrates. The liquid crystal display apparatus further includes a display driving section to supply signals to electrodes formed on a pair of substrates and to drive the liquid crystal display device based on picture data supplied from the outside.

In this liquid crystal display apparatus, it is preferable that one of the pair of substrates is provided with at least one opposed electrode, the other of the pair of substrates is provided with a plurality of pixel electrodes in which regions respectively facing the opposed electrode form a plurality of pixels aligned in a matrix to form images, and the display driving section includes: a scan line driving circuit to supply a scan signal that scans lines at least one by one to the plurality of pixels aligned in the matrix; a data line driving circuit to generate a signal supplied to each of the pixels in accordance with supplied picture data and supply the generated signal to each of the pixels; and a driving control circuit to control operations of the scan line driving circuit and the data line driving circuit.

Additionally, in the liquid crystal display apparatus, it is preferable for the retardation in the thickness direction of each of the plurality of optical layers and the retardation in the liquid crystal layer thickness direction of the liquid crystal layer to be set so that a value obtained by adding a total value of the retardations in the thickness direction of the plurality of optical layers and the value of the retardation in the liquid crystal layer thickness direction of the liquid crystal layer falls within the range of −80 nm to +80 nm.

Furthermore, in this liquid crystal display apparatus, it is preferable for the value of the retardation in the liquid crystal layer thickness direction of the liquid crystal layer when a voltage that is sufficiently high to raise and align the liquid crystal molecules is applied and the total value of the retardations in the thickness direction of the plurality of optical layers between the first and second polarizing layers excluding the liquid crystal layer to be set so that a difference between absolute values of these values is not greater than 80 nm and these values have a positive and a negative signs opposite to each other. In this case, it is preferable for the retardation in the liquid crystal layer thickness direction to be a value calculated by multiplying a value of a product $\Delta nd$ of an anisotropic refractive index $\Delta n$ of a liquid crystal material constituting the liquid crystal layer and a liquid crystal layer thickness d by a coefficient in the range of 0.72 to 0.89 that is selected in accordance with a pre-tilt angle of the liquid crystal molecules with respect to the substrate surfaces and a value of the voltage that is sufficiently high to raise and align the liquid crystal molecules. Moreover, in regard to each of the plurality of optical layers excluding the liquid crystal layer between the first polarizing layer and the second polarizing layer, assuming that one and the other of two directions perpendicular to each other within a plane parallel to the substrate surfaces are an X axis and a Y axis, a thickness direction perpendicular to the substrate surfaces is a Z axis, a refractive index in the X axis direction is nx, a refractive index in the Y axis direction is ny, a refractive index in the Z axis direction is nz, and a layer thickness of the optical layer is d, it is preferable for a total value of retardations in the thickness direction of the respective optical layer each of which is expressed as $\{(nx+ny)/2-nz\} \cdot d$ to be set to a value that is substantially equal to a value calculated by multiplying a value of the product $\Delta nd$ of the anisotropic refractive index $\Delta n$ of the liquid crystal material constituting the liquid crystal layer and the liquid crystal layer thickness d by a coefficient in the range of 0.72 to 0.89 selected in accordance with a pre-tilt angle of the liquid crystal molecules with respect to the substrate surfaces and a value of the voltage that is sufficiently high to raise and align the liquid crystal molecules. Additionally, it is preferable for the total value of the retardation values in the thickness direction of the respective optical layers between the first and second polarizing layers excluding the liquid crystal layer to be set substantially equal to a value calculated by multiplying the product $\Delta nd$ of the anisotropic refractive index $\Delta n$ of the liquid crystal material constituting the liquid crystal layer and the liquid crystal layer thickness d by a coefficient 0.83.

In the liquid crystal display apparatus according to the present invention, it is preferable for a total value of in-plane retardations of the respective optical layers between the first and second polarizing layers including the liquid crystal layer to be set to the range of 350 nm to 600 nm, the in-plane retardation of each optical layer being a product of an in-plane phase difference within a plane parallel to the substrate surfaces and a layer thickness of each optical layer.

In the liquid crystal display apparatus according to the present invention, the liquid crystal cell includes: a first substrate having, on one surface thereof, at least one first electrode and a first alignment film covering the first electrode and subjected to an aligning treatment in a predetermined first direction; a second substrate that is arranged to face an electrode formation surface of the first substrate, and has, on a surface facing the first substrate, at least one second electrode facing the first electrode and a second alignment film covering the second electrode and subjected to an aligning treatment in a second direction crossing the first direction at an angle of substantially 90°; and a liquid crystal layer that is twist-aligned and held at a twisted angle of substantially 90° between the first alignment film of the first substrate and the second alignment film of the second substrate. It is preferable for the first polarizing plate has a first polarizing layer to have an absorption axis in a direction crossing an aligning treatment direction of the first alignment film at an angle of substantially 45°, and for the second polarizing plate to have a second polarizing layer having an absorption axis in a direction substantially perpendicular to or substantially parallel to the absorption axis of the first polarizing layer.

In the liquid crystal display device according to the present invention, each of the first and second polarizing layers preferably includes a base film formed of a resin film that is provided on at least a surface of the polarizing layer facing the first or second substrate and has a retardation in a thickness direction, which is a product of a phase difference within a plane perpendicular to the substrate surfaces and a layer thickness. Each of the first and second viewing angle compensating layers preferably includes a base film formed of a resin film that is provided on at least one surface of the viewing angle compensating layer and has a retardation in the thickness direction, which is a product of a phase difference within a plane perpendicular to the substrate surfaces and a layer thickness. The plurality of optical layers between the first and second polarizing layers excluding the liquid crystal layer preferably include at least the base films on the surfaces of the first and second polarizing layers facing the first and second substrates, the first and second viewing angle compensating layers, and the base films of these viewing angle compensating layers.

In the liquid crystal display apparatus according to the present invention, it is preferable that a first retardation plate is further arranged between the first polarizing layer and the first viewing angle compensating layer and a second retardation plate is further arranged between the second polarizing layer and the second viewing angle compensating layer. In this case, each of the first and second polarizing layers preferably includes a base film formed of a resin film that is provided on at least the surface of the polarizing layer facing the first or second substrate and has a retardation in the thickness direction, which is a product of a phase difference within a plane perpendicular to the substrate surfaces and a layer thickness, and the first and second viewing angle compensating layers are preferably respectively formed on plate surfaces of the first retardation plate and the second retardation plate. Furthermore, each of the first and second polarizing layers preferably includes a base film formed of a resin film arranged on an outer surface of the polarizing layer opposite to the surface facing the first or second substrate. Each of the first and second viewing angle compensating layers preferably includes a base film formed of a resin film that is provided on at least one surface of the viewing angle compensating layer and has a retardation in the thickness direction, which is a product of a phase difference in a plane perpendicular to the substrate surfaces and a layer thickness. The first and second retardation plates are preferably laminated on the surfaces of the first and second polarizing layers facing the first and second substrates, respectively. Moreover, each of the first and second polarizing layers preferably includes a base film formed of a resin film arranged on the outer surface of the polarizing layer opposite to the surface facing the first or second substrate. The first and second retardation plates are preferably laminated on the surfaces of the first and second polarizing layers facing the first and second substrates, respectively. The first and second viewing angle compensating layers are preferably formed on the plate surfaces of the first and second retardation plates, respectively. Additionally, it is preferable that an optical film is further arranged either between the first retardation plate and the first viewing angle compensating layer or between the second retardation plate and the second viewing angle compensating layer, the optical film having one refractive index nx and the other refractive index in two directions perpendicular to each other within a plane parallel to the substrate surfaces, and a refractive index nz in a thickness direction perpendicular to the substrate surfaces satisfying a relationship of nx=ny>nz.

The broadcasting receiving apparatus according to the present invention includes: a broadcasting receiving section to receive broadcasted broadcast waves and to demodulate the received waves to output a demodulation signal having at least picture data and audio data; a picture/audio data generating section to separate the picture data and the audio data from the demodulation signal output from the broadcasting receiving section and to output a picture data and an audio data based on the demodulation signal; a picture display section to drive a plurality of pixels aligned in a matrix based on the picture data supplied from the picture/audio data generating section to display pictures; and a liquid crystal display device. The liquid crystal display device includes: a first substrate having, on one surface thereof, at least one first electrode and an alignment film covering the first electrode; a second substrate that is arranged to face an electrode formation surface of the first substrate, and has, on a surface thereof facing the first substrate, a plurality of second electrodes in which regions respectively facing the first electrode form a plurality of pixels aligned in a matrix to form images and an alignment film covering these electrodes; a liquid crystal layer that is sandwiched between the first and second substrates and includes liquid crystal molecules twist-aligned at substantially 90°; first and second polarizing plates that are arranged on both sides of the liquid crystal cell, each of the polarizing plates including a polarizing layer having a transmission axis allowing transmission of linear polarized light and an absorption axis in a direction perpendicular to the transmission axis, and at least one base film to support the polarizing layer; and first and second viewing angle compensating plates that are respectively arranged between the liquid crystal cell and the first and second polarizing plates, each of the viewing angle compensating plates having a phase difference within a plane parallel to substrate surfaces of the liquid crystal cell and a phase difference within a plane perpendicular to the substrate surfaces, and a total value of retardations in a thickness direction, each of which is a product of a phase difference within a plane perpendicular to the substrate surfaces and a layer thickness, of a plurality of optical layers between the first and second polarizing layers, including at least the first and second viewing angle compensating plates but excluding the liquid crystal layer, is set to a value that cancels out a retardation in a liquid crystal layer thickness direction, which is a product of a phase difference within a plane perpendicular to the substrate surfaces and a liquid crystal layer thickness, of the liquid crystal layer when a voltage sufficiently high to raise and align the liquid crystal molecules with respect to the substrate surfaces is applied between the electrodes of the first and second substrates. The broadcasting receiving apparatus further includes an audio generating section to generate the audio signal based on the audio data supplied from the picture/audio data generating section to produce audio from the audio signal.

In this case, it is preferable that the broadcasting receiving section includes: a tuner section to receive a wirelessly broadcasted digital broadcasting signal; and a demodulating section to demodulate the received digital broadcasting signal to a multiple signal including at least picture data and audio data, and the picture/audio data generating section includes a picture/audio decoding processing section to separate the picture data and the audio data from the multiple signal and to decode the separated data to generate a picture data and an audio data.

Further, it is preferable that the first substrate is provided with a first alignment film covering the first electrode and subjected to an aligning treatment in a predetermined first direction, the second electrodes is provided with a second alignment film covering the second electrode and subjected to an aligning treatment in a second direction that crosses the first direction at an angle of substantially 90°, the first polarizing plate includes a first polarizing layer that has an absorption axis in a direction crossing the aligning treatment direction of the first alignment film at an angle of substantially 45° and a base film formed of a resin film that is provided on a surface of the first polarizing layer facing at least the first substrate and has a retardation in a thickness direction, which is a product of a phase difference within a plane perpendicular to substrate surfaces of the first and second substrates and a layer thickness, the second polarizing plate includes a second polarizing layer that has an absorption axis in a direction substantially perpendicular to or substantially parallel to the absorption axis of the first polarizing layer and a base film formed of a resin film that is provided on a surface of the second polarizing layer facing at least the second substrate and has a retardation in a thickness direction, which is a product of a phase difference within a plane perpendicular to the substrate surfaces and a layer thickness, each of the first and second viewing angle compensating plates includes a viewing angle compensating layer having a phase difference within a plane parallel to the substrate surfaces and a phase difference within a plane perpendicular to the substrate surfaces and a base film formed of a resin film that is provided on at least one surface of the viewing angle compensating layer and has a retardation in a thickness direction, which is a product of a phase difference within the plane perpendicular to the substrate surfaces and a layer thickness. It is also preferable that a total value of the retardation values in the thickness direction, each of which is a product of a phase difference within a plane perpendicular to the substrate surfaces and a layer thickness, of a plurality of optical layers arranged between the first polarizing layer of the first polarizing plate and the second polarizing layer of the second polarizing plate, the plurality of optical layers including the base films on the surfaces of at least the first and second polarizing plates facing the first and second substrates, the respective viewing angle compensating layers of the first and second viewing angle compensating plates, and the base films of the first and second viewing angle compensating plates but excluding the liquid crystal layer, and a retardation value in a liquid crystal layer thickness direction, which is a product of a phase difference within a plane perpendicular to the substrate surfaces and a liquid crystal layer thickness, of the liquid crystal layer when a voltage sufficiently high to raise and align the liquid crystal molecules with respect to the substrate surfaces is applied between the electrodes of the first and second substrates is set to the range of −80 nm to +80 nm.

In this broadcasting receiving apparatus, it is preferable for the retardation in the liquid crystal layer thickness direction of the liquid crystal display device to be a value calculated by multiplying a value of a product $\Delta$nd of an anisotropic refractive index $\Delta$n of a liquid crystal material constituting the liquid crystal layer and a liquid crystal layer thickness d by a coefficient in the range of 0.72 to 0.89 selected in accordance with a pre-tilt angle of the liquid crystal molecules with respect to the substrate surfaces and a value of the voltage sufficiently high to raise and align the liquid crystal molecules.

Furthermore, it is preferable for a total value of in-plane retardations of the plurality of optical layers between the first and second polarizing layers, including the plurality of base films, the plurality of viewing angle compensating layers, and the liquid crystal layer, to be set to the range of 350 nm to 600 nm, the in-plane retardation being a product of an in-plane phase difference within a plane parallel to the substrate surfaces and a layer thickness of each of the plurality of optical layers.

Moreover, it is preferable for a first retardation plate to be arranged between the first polarizing layer and the first viewing angle compensating layer and a second retardation plate to be arranged between the second polarizing layer an the second viewing angle compensating layer.

The broadcasting receiving apparatus according to the present invention includes: a broadcasting receiving section to receive broadcasted broadcast waves and to demodulate the received waves to output a demodulation signal having at least picture data and audio data; an picture/audio data generating section to separate the picture data and the audio data from the demodulation signal output from the broadcasting receiving section and to output a picture data and an audio data based on the demodulation signal; a picture display section to drive a plurality of pixels aligned in a matrix based on the picture data supplied from the picture/audio data generating section to display pictures; and a liquid crystal display device. The liquid crystal display device includes: a first substrate having, on one surface thereof, at least one first electrode and a first alignment film covering the first electrode and subjected to an aligning treatment in a predetermined first direction; a second substrate that is arranged to face an electrode formation surface of the first electrode, and has, on a surface thereof facing the first substrate, a plurality of second electrodes in which regions respectively facing the first electrode form a plurality of pixels aligned in a matrix to form images and a second alignment film covering the second electrode and subjected to an aligning treatment in a second direction crossing the first direction at an angle of substantially 90°; a liquid crystal layer that is sandwiched between the first alignment film of the first substrate and the second alignment film of the second substrate and includes liquid crystal molecules twist-aligned between the first alignment film and the second alignment film at a twisted angle of substantially 90°; a first polarizing layer that is arranged to face an outer surface opposite to the electrode formation surface of the first substrate and has an absorption axis in a direction crossing an aligning treatment direction of the first alignment film at an angle of substantially 45°; a second polarizing layer that is arranged to face an outer surface opposite to an electrode formation surface of the second substrate and has an absorption axis in a direction substantially perpendicular to or substantially parallel to the absorption axis of the first polarizing layer; and first and second viewing angle compensating layers that are respectively arranged between the first substrate and the first polarizing layer and between the second substrate and the second polarizing layer, each viewing angle compensating layer having a phase difference within a plane parallel to substrate surfaces of the first and second substrates and a phase difference within a plane perpendicular to the substrate surfaces. In regard to a plurality of optical layers between the first and second polarizing layers including at least the first and second viewing angle compensating layers but excluding the liquid crystal layer, a retardation Rth in a thickness direction is set to the range satisfying the following expression:

$$-80\ nm < Rth - 0.83 \Delta nd < 80\ nm$$

where one and the other of two directions perpendicular to each other within a plane parallel to the substrate surfaces are an X axis and a Y axis, a thickness direction perpendicular to the substrate surfaces is a Z axis, nx is a refractive index in the X axis direction, ny is a refractive index in the Y axis direction, nz is a refractive index in the Z axis direction, d is a layer thickness of the optical layer, Rthi is a retardation in the thickness direction of each optical layer represented as $\{(nx+ny)/2-nz\} \cdot d$, Rth is the retardation in the thickness direction obtained by adding values of the retardations Rthi in the thickness direction of the respective optical layers, and $\Delta nd$ is a product of an anisotropic refractive index $\Delta n$ of a liquid crystal material constituting the liquid crystal layer and a liquid crystal thickness d. The broadcasting receiving apparatus further includes an audio generating section to generate the audio signal based on the audio data supplied from the picture/audio data generating section and to produce audio from the audio signal.

In this broadcasting receiving apparatus, in regard to the plurality of optical layers between the first polarizing layer and the second polarizing layer, assuming that an in-plane retardation of each optical layer represented as $(nx-ny) \cdot d$ is Roi, and an in-plane retardation obtained by adding values of the in-plane retardations of the respective optical layers is Ro, it is preferable for each of the in-plane retardation Ro and $\Delta nd$ of the liquid crystal layer to be set to the range satisfying Ro+$\Delta nd$=350 nm to 600 nm.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display apparatus comprising:
 a liquid crystal display device including:
  a liquid crystal cell including a pair of substrates in which at least one electrode and an alignment film covering the electrode are provided on each of inner surfaces of the substrates facing each other, and a liquid crystal layer that is sandwiched between the substrates and includes liquid crystal molecules twist-aligned;
 first and second polarizing plates that are arranged on both sides of the liquid crystal cell, each of the polarizing plates including a polarizing layer having a transmission axis allowing transmission of linear polarized light and an absorption axis in a direction perpendicular to the transmission axis, and at least one base film to support the polarizing layer; and
 first and second viewing angle compensating layers that are respectively arranged between the liquid crystal cell and the first and second polarizing plates, each of the viewing angle compensating layers having a phase difference within a plane parallel to substrate surfaces of the liquid crystal cell and a phase difference within a plane perpendicular to the substrate surfaces,
 a total value of retardations in a thickness direction, each of which is a product of a phase difference within a plane perpendicular to the substrate surfaces and a layer thickness, of a plurality of optical layers between the first and second polarizing layers, including at least the first and second viewing angle compensating layers but excluding the liquid crystal layer, being set to a value that cancels out a retardation in a liquid crystal layer thickness direction, which is a product of a phase difference within a plane perpendicular to the substrate surfaces and a liquid crystal layer thickness, of the liquid crystal layer when a voltage sufficiently high to raise and align the liquid crystal molecules with respect to the substrate surfaces is applied to the liquid crystal layer between the electrodes of the first and second substrates; and
 a display driving section to supply signals to electrodes formed on a pair of substrates and to drive the liquid crystal display device based on picture data supplied from the outside.

2. The apparatus according to claim 1, wherein
 one of the pair of substrates is provided with at least one opposed electrode, the other of the pair of substrates is provided with a plurality of pixel electrodes in which regions respectively facing the opposed electrode form a plurality of pixels aligned in a matrix to form images, and
 the display driving section includes:
 a scan line driving circuit to supply a scan signal that scans lines at least one by one to the plurality of pixels aligned in the matrix;
 a data line driving circuit to generate a signal supplied to each of the pixels in accordance with supplied picture data and supply the generated signal to each of the pixels; and
 a driving control circuit to control operations of the scan line driving circuit and the data line driving circuit.

3. The liquid crystal display apparatus according to claim 1, wherein the retardation in the thickness direction of each of the plurality of optical layers and the retardation in the liquid crystal layer thickness direction of the liquid crystal layer are set so that a value obtained by adding a total value of the retardations in the thickness direction of the plurality of optical layers to a value of the retardation in the liquid crystal layer thickness direction of the liquid crystal layer falls within the range of −80 nm to +80 nm.

4. The liquid crystal display apparatus according to claim 1, wherein a value of the retardation in the liquid crystal layer thickness direction of the liquid crystal layer when the voltage sufficiently high to raise and align the liquid crystal molecules is applied and a total value of the retardations in the thickness directions of the plurality of optical layers between the first and second polarizing layers excluding the liquid crystal layer are set so that a difference between their absolute values becomes not greater than 80 nm and they have a positive and a negative signs opposite to each other.

5. The liquid crystal display apparatus according to claim 4, wherein the retardation in the liquid crystal layer thickness direction is a value calculated by multiplying a value of a product Δnd of an anisotropic refractive index Δn of a liquid crystal material constituting the liquid crystal layer and a liquid crystal layer thickness d by a coefficient in the range of 0.72 to 0.89 selected in accordance with a pre-tilt angle of the liquid crystal molecules with respect to the substrate surfaces and a value of the voltage sufficiently high to raise and align the liquid crystal molecules.

6. The liquid crystal display apparatus according to claim 4, wherein, in regard to each of the plurality of optical layers between the first and second polarizing layers excluding the liquid crystal layer, a total value of the retardations in the thickness direction of the respective optical layers each of which is represented as $\{(nx+ny)/2-nz\} \cdot d$ is set to a value substantially equal to a value calculated by multiplying a value of a product Δnd of an anisotropic refractive index Δn of a liquid crystal material constituting the liquid crystal layer and a liquid crystal layer thickness d by a coefficient in the range of 0.72 to 0.89 selected in accordance with a pre-tilt angle of the liquid crystal molecules with respect to the substrate surfaces and a value of the voltage sufficiently high to raise and align the liquid crystal molecules, where one and the other of two directions perpendicular to each other within a plane parallel to the substrate surfaces are an X axis and a Y axis, a thickness direction perpendicular to the substrate surfaces is a Z axis, nx is a refractive index in the X axis direction, ny is a refractive index in the Y axis direction, nz is a refractive index in the Z axis direction, and d is a layer thickness of the optical layer.

7. The liquid crystal display apparatus according to claim 4, wherein a total value of the retardations in the thickness direction of the plurality of optical layers between the first and second polarizing layers excluding the liquid crystal layer is set to be substantially equal to a value calculated by multiplying a value of a product Δnd of an anisotropic refractive index Δn of a liquid crystal material constituting the liquid crystal layer and a liquid crystal layer thickness d by a coefficient 0.83.

8. The liquid crystal display apparatus according to claim 1, wherein a total value of in-plane retardations of the plurality of optical layers between the first and second polarizing layers including the liquid crystal layer is set to the range of 350 nm to 600 nm, the in-plane retardation being a product of an in-plane phase difference within a plane parallel to the substrate surfaces and a layer thickness of each of the plurality of optical layers.

9. The apparatus according to claim 1, wherein the liquid crystal cell comprises:
a first substrate having, on one surface thereof, at least one first electrode and a first alignment film covering the first electrode and subjected to an aligning treatment in a predetermined first direction;
a second substrate that is arranged to face an electrode formation surface of the first electrode, and has, on a surface facing the first substrate, at least one second electrode facing the first electrode and a second alignment film covering the second electrode and subjected to an aligning treatment in a second direction crossing the first direction at an angle of substantially 90°; and
a liquid crystal layer that is twist-aligned and sandwiched between the first alignment film of the first substrate and the second alignment film of the second substrate at a twisted angle of substantially 90°,
the first polarizing plate has a first polarizing layer having an absorption axis in a direction crossing an aligning treatment direction of the first alignment film at an angle of substantially 45°, and
the second polarizing plate has a second polarizing layer having an absorption axis in a direction substantially perpendicular to or substantially parallel to the absorption axis of the first polarizing layer.

10. The liquid crystal display apparatus according to claim 1, wherein
each of the first and second polarizing layers includes a base film formed of a resin film that is provided on at least a surface of the polarizing layer facing the first or second substrate and has a retardation in the thickness direction, which is a product of a phase difference within a plane perpendicular to the substrate surfaces and a layer thickness,
each of the first and second viewing angle compensating layers includes a base film formed of a resin film that is provided on at least one surface of the viewing angle compensating layer and has a retardation in the thickness direction, which is a product of a phase difference within a plane perpendicular to the substrate surfaces and a layer thickness, and
the plurality of optical layers between the first and second polarizing layers excluding the liquid crystal layer include at least the base films on the surfaces of the first and second polarizing layers facing the first and second substrates, the first and second viewing angle compensating layers, and the base films of the viewing angle compensating layers.

11. The liquid crystal display apparatus according to claim 1, wherein a first retardation plate is arranged between the first polarizing layer and the first viewing angle compensating layer, and a second retardation plate is further arranged between the second polarizing layer and the second viewing angle compensating layer.

12. The liquid crystal display apparatus according to claim 11, wherein
each of the first and second polarizing layers includes a base film formed of a resin film that is provided on at least a surface of the polarizing layer facing the first or second substrate and has a retardation in the thickness direction, which is a product of a phase difference within a plane perpendicular to the substrate surfaces and a layer thickness, and
the first and second viewing angle compensating layers are respectively formed on plate surfaces of the first retardation plate and the second retardation plate.

13. The liquid crystal display apparatus according to claim 11, wherein
each of the first and second polarizing layers includes a base film formed of a resin film arranged on an outer surface of the polarizing layer opposite to a surface facing the first or second substrate,
each of the first and second viewing angle compensating layers includes a base film formed of a resin film that is provided on at least one surface of the viewing angle compensating layer and has a retardation in the thickness direction, which is a product of a phase difference within a plate perpendicular to the substrate surfaces and a layer thickness, and the first and second retardation plates are respectively laminated on surfaces of the first and second polarizing layers facing the first and second substrates.

14. The liquid crystal display apparatus according to claim 11, wherein
each of the first and second polarizing layers includes a base film formed of a resin film that is arranged on an outer surface of the polarizing layer opposite to a surface facing the first or second substrate,
the first and second retardation plates are respectively laminated on the surfaces of the first and second polarizing layers facing the first and second substrates, and
the first and second viewing angle compensating layers are respectively formed on plate surfaces of the first and second retardation plates.

15. The liquid crystal display apparatus according to claim 11, wherein an optical film is further arranged on either between the first retardation plate and the first viewing angle compensating layer or between the second retardation plate and the second viewing angle compensating layer, the optical film having a refractive index nx in one of two directions perpendicular to each other within a plane parallel to the substrate surfaces, a refractive index ny in the other direction, and a refractive index nz in the thickness direction perpendicular to the substrate surfaces, the refractive indices having a relationship of nx=ny>nz.

16. A broadcasting receiving apparatus comprising:
a broadcasting receiving section to receive broadcasted broadcast waves and to demodulate the received waves to output a demodulation signal having at least picture data and audio data;
a picture/audio data generating section to separate the picture data and the audio data from the demodulation signal output from the broadcasting receiving section and to output a picture data and an audio data based on the demodulation signal;
a picture display section to drive a plurality of pixels aligned in a matrix based on the picture data supplied from the picture/audio data generating section to display pictures;
a liquid crystal display device including:
a first substrate having, on one surface thereof, at least one first electrode and an alignment film covering the first electrode;
a second substrate that is arranged to face an electrode formation surface of the first substrate, and has, on a surface thereof facing the first substrate, a plurality of second electrodes in which regions respectively facing the first electrode form a plurality of pixels aligned in a matrix to form images and an alignment film covering these electrodes;
a liquid crystal layer that is sandwiched between the first and second substrates and includes liquid crystal molecules twist-aligned at substantially 90°;
first and second polarizing plates that are arranged on both sides of the liquid crystal cell, each of the polarizing plates including a polarizing layer having a transmission axis allowing transmission of linear polarized light and an absorption axis in a direction perpendicular to the transmission axis, and at least one base film to support the polarizing layer; and
first and second viewing angle compensating plates that are respectively arranged between the liquid crystal cell and the first and second polarizing plates, each of the viewing angle compensating plates having a phase difference within a plane parallel to substrate surfaces of the liquid crystal cell and a phase difference within a plane perpendicular to the substrate surfaces, and
a total value of retardations in a thickness direction, each of which is a product of a phase difference within a plane perpendicular to the substrate surfaces and a layer thickness, of a plurality of optical layers between the first and second polarizing layers, including at least the first and second viewing angle compensating plates but excluding the liquid crystal layer, being set to a value that cancels out a retardation in a liquid crystal layer thickness direction, which is a product of a phase difference within a plane perpendicular to the substrate surfaces and a liquid crystal layer thickness, of the liquid crystal layer when a voltage sufficiently high to raise and align the liquid crystal molecules with respect to the substrate surfaces is applied between the electrodes of the first and second substrates; and
an audio generating section to generate the audio signal based on the audio data supplied from the picture/audio data generating section to produce audio from the audio signal.

17. The apparatus according to claim 16, wherein
the broadcasting receiving section includes a tuner section to receive a wirelessly broadcasted digital broadcasting signal and a demodulating section to demodulate the received digital broadcasting signal to a multiple signal including at least picture data and audio data, and
the picture/audio data generating section includes a picture/audio decoding processing section to separate the picture data and the audio data from the multiple signal and to decode the separated data to generate a picture data and an audio data.

18. The apparatus according to claim 16, wherein
the first substrate is provided with a first alignment film covering the first electrode and subjected to an aligning treatment in a predetermined first direction,
the second electrodes is provided with a second alignment film covering the second electrode and subjected to an aligning treatment in a second direction that crosses the first direction at an angle of substantially 90°,
the first polarizing plate includes a first polarizing layer that has an absorption axis in a direction crossing the aligning treatment direction of the first alignment film at an angle of substantially 45° and a base film formed of a resin film that is provided on a surface of the first polarizing layer facing at least the first substrate and has a retardation in a thickness direction, which is a product of a phase difference within a plane perpendicular to substrate surfaces of the first and second substrates and a layer thickness,
the second polarizing plate includes a second polarizing layer that has an absorption axis in a direction substantially perpendicular to or substantially parallel to the absorption axis of the first polarizing layer and a base film formed of a resin film that is provided on a surface of the second polarizing layer facing at least the second substrate and has a retardation in a thickness direction, which is a product of a phase difference within a plane perpendicular to the substrate surfaces and a layer thickness,
each of the first and second viewing angle compensating plates includes a viewing angle compensating layer having a phase difference within a plane parallel to the substrate surfaces and a phase difference within a plane perpendicular to the substrate surfaces and a base film formed of a resin film that is provided on at least one surface of the viewing angle compensating layer and has a retardation in a thickness direction, which is a product of a phase difference within the plane perpendicular to the substrate surfaces and a layer thickness, and a total value of the retardation values in the thickness direction, each of which is a product of a phase difference within a plane perpendicular to the substrate surfaces and a layer thickness, of a plurality of optical layers arranged between the first polarizing layer of the first polarizing plate and the second polarizing layer of the second polarizing plate, the plurality of optical layers including the base films on the surfaces of at least the first and second polarizing plates facing the first and second substrates, the respective viewing angle compensating layers of the first and second viewing angle compensating plates, and the base films of the first and second viewing angle compensating plates but excluding the liquid crystal layer, and a retardation value in a liquid crystal layer thickness direction, which is a product of a phase difference within a plane perpendicular to the substrate surfaces and a liquid crystal layer thickness, of the liquid crystal layer when a voltage sufficiently high to raise and align the liquid crystal molecules with respect to the substrate surfaces is applied between the electrodes of the first and second substrates is set to the range of −80 nm to +80 nm.

19. The apparatus according to claim 16, wherein the retardation in the liquid crystal layer thickness direction is a value calculated by multiplying a value of a product $\Delta$nd of an anisotropic refractive index $\Delta$n of a liquid crystal material constituting the liquid crystal layer and a liquid crystal layer thickness d by a coefficient in the range of 0.72 to 0.89 selected in accordance with a pre-tilt angle of the liquid crystal molecules with respect to the substrate surfaces and a value of the voltage sufficiently high to raise and align the liquid crystal molecules.

20. The apparatus according to claim 16, wherein a total value of in-plane retardations, each of which is a product of an in-plane phase difference within a plane parallel to the substrate surfaces and a layer thickness, of the plurality of optical layers between the first and second polarizing layers, including the plurality of base films, the plurality of viewing angle compensating layers, and the liquid crystal layer, is set to the range of 350 nm to 600 nm.

21. The apparatus according to claim 16, further comprising a first retardation plate arranged between the first polarizing layer and the first viewing angle compensating layer, and a second retardation plate arranged between the second polarizing layer and the second viewing angle compensating layer.

22. A broadcasting receiving apparatus comprising:

a broadcasting receiving section to receive broadcasted broadcast waves and to demodulate the received waves to output a demodulation signal having at least picture data and audio data;

an picture/audio data generating section to separate the picture data and the audio data from the demodulation signal output from the broadcasting receiving section and to output a picture data and an audio data based on the demodulation signal;

a picture display section to drive a plurality of pixels aligned in a matrix based on the picture data supplied from the picture/audio data generating section to display pictures;

a liquid crystal display including:
a first substrate having, on one surface thereof, at least one electrode and a first alignment film covering the first electrode and subjected to an aligning treatment in a predetermined first direction;

a second substrate that is arranged to face an electrode formation surface of the first electrode, and has, on a surface thereof facing the first substrate, a plurality of second electrodes in which regions respectively facing the first electrode form a plurality of pixels aligned in a matrix to form images and a second alignment film covering the second electrode and subjected to an aligning treatment in a second direction crossing the first direction at an angle of substantially 90°;

a liquid crystal layer that is sandwiched between the first alignment film of the first substrate and the second alignment film of the second substrate and includes liquid crystal molecules twist-aligned between the first alignment film and the second alignment film at a twisted angle of substantially 90°;

a first polarizing layer that is arranged to face an outer surface opposite to the electrode formation surface of the first substrate and has an absorption axis in a direction crossing an aligning treatment direction of the first alignment film at an angle of substantially 45°;

a second polarizing layer that is arranged to face an outer surface opposite to an electrode formation surface of the second substrate and has an absorption axis in a direction substantially perpendicular to or substantially parallel to the absorption axis of the first polarizing layer; and first and second viewing angle compensating layers that are respectively arranged between the first substrate and the first polarizing layer and between the second substrate and the second polarizing layer, each viewing angle compensating layer having a phase difference within a plane parallel to substrate surfaces of the first and second substrates and a phase difference within a plane perpendicular to the substrate surfaces, in regard to a plurality of optical layers between the first and second polarizing layers including at least the first and second viewing angle compensating layers but excluding the liquid crystal layer, a retardation Rth in a thickness direction being set to the range satisfying the following expression:

$$-80 \text{ nm} < Rth - 0.83\Delta nd < 80 \text{ nm}$$

where one and the other of two directions perpendicular to each other within a plane parallel to the substrate surfaces are an X axis and a Y axis, a thickness direction perpendicular to the substrate surfaces is a Z axis, nx is a refractive index in the X axis direction, ny is a refractive index in the Y axis direction, nz is a refractive index in the Z axis direction, d is a layer thickness of the optical layer, Rthi is a retardation in the thickness direction of each optical layer represented as $\{(nx+ny)/2-nz\}\cdot d$, Rth is the retardation in the thickness direction obtained by adding values of the retardations Rthi in the thickness direction of the respective optical layers, and $\Delta$nd is a product of an anisotropic refractive index $\Delta$n of a liquid crystal material constituting the liquid crystal layer and a liquid crystal thickness d; and an audio generating section to generate the audio signal based on the audio data supplied from the picture/audio data generating section and to produce audio from the audio signal.

* * * * *

UNITED STATES PATENT AND TRADEMARK OFFICE
CERTIFICATE OF CORRECTION

PATENT NO. : 7,667,802 B2  Page 1 of 1
APPLICATION NO. : 12/009928
DATED : February 23, 2010
INVENTOR(S) : Kazuhiko Ohsawa et al.

It is certified that error appears in the above-identified patent and that said Letters Patent is hereby corrected as shown below:

Column 23, line 46, replace "compensating" with --polarizing--.

Signed and Sealed this

Seventh Day of December, 2010

David J. Kappos
*Director of the United States Patent and Trademark Office*